US012211439B2

(12) United States Patent
Xiong et al.

(10) Patent No.: US 12,211,439 B2
(45) Date of Patent: Jan. 28, 2025

(54) DISPLAY PANEL AND DISPLAY DEVICE

(71) Applicants: Mianyang BOE Optoelectronics Technology Co., Ltd., Sichuan (CN); BOE Technology Group Co., Ltd., Beijing (CN)

(72) Inventors: Lin Xiong, Beijing (CN); Xin Cao, Beijing (CN); Jenyu Lee, Beijing (CN); Haoyuan Fan, Beijing (CN); Zifeng Wang, Beijing (CN); Jie Tu, Beijing (CN); Tianlong Zhao, Beijing (CN); Ming Lei, Beijing (CN); Yanchun Xie, Beijing (CN); Zongying Liu, Beijing (CN)

(73) Assignees: Mianyang BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/907,813

(22) PCT Filed: Nov. 11, 2021

(86) PCT No.: PCT/CN2021/130090
§ 371 (c)(1),
(2) Date: Aug. 29, 2022

(87) PCT Pub. No.: WO2022/227492
PCT Pub. Date: Nov. 3, 2022

(65) Prior Publication Data

US 2024/0194136 A1 Jun. 13, 2024

(30) Foreign Application Priority Data

Apr. 28, 2021 (CN) ......................... 202110470431.4

(51) Int. Cl.
*G09G 3/3233* (2016.01)

(52) U.S. Cl.
CPC ..... *G09G 3/3233* (2013.01); *G09G 2310/061* (2013.01)

(58) Field of Classification Search
None
See application file for complete search history.

(56) References Cited

U.S. PATENT DOCUMENTS 11,263,965 B2 * 3/2022 Yoon .................... H10K 59/131
2009/0096725 A1 4/2009 Kretz et al.
(Continued)

FOREIGN PATENT DOCUMENTS

CN 105609049 A 5/2016
CN 106991966 A 7/2017
(Continued)

OTHER PUBLICATIONS

CN202110470431.4 first office action.
CN202110470431.4 second office action.
CN202110470431.4 third office action.

*Primary Examiner* — Matthew Yeung
(74) *Attorney, Agent, or Firm* — IPro, PLLC

(57) ABSTRACT

Provided is a display panel. The display panel includes a base substrate and a plurality of pixel circuits disposed on the base substrate. At least two pixel circuits in a same column are coupled with a same first initial power line, such that only a small quantity of signal lines need to be disposed on the base substrate.

18 Claims, 26 Drawing Sheets

(56) References Cited

U.S. PATENT DOCUMENTS

| | | | | |
|---|---|---|---|---|
| 2018/0006105 | A1* | 1/2018 | Kim | G09G 3/3225 |
| 2018/0061318 | A1 | 3/2018 | Yin et al. | |
| 2018/0342201 | A1* | 11/2018 | Feng | G09G 3/3208 |
| 2022/0180816 | A1 | 6/2022 | Yuan et al. | |
| 2022/0262309 | A1 | 8/2022 | Zhang et al. | |

FOREIGN PATENT DOCUMENTS

| | | | |
|---|---|---|---|
| CN | 110459175 | A | 11/2019 |
| CN | 111445848 | A | 7/2020 |
| CN | 111489698 | A | 8/2020 |
| CN | 111564140 | A | 8/2020 |
| CN | 111816123 | A | 10/2020 |
| CN | 112002284 | A | 11/2020 |
| CN | 112309334 | A | 2/2021 |
| CN | 113205773 | A | 8/2021 |

* cited by examiner

DISPLAY PANEL AND DISPLAY DEVICE

CROSS-REFERENCE TO RELATED APPLICATION

The present disclosure is a U.S. national phase application based on PCT/CN2021/130090, filed on Nov. 11, 2021, which is based on and claims priority to the Chinese Patent Application No. 202110470431.4, filed on Apr. 28, 2021 and entitled "DISPLAY PANEL AND DISPLAY DEVICE," all of which are hereby incorporated by reference in their entireties for all purposes.

TECHNICAL FIELD

The present disclosure relates to the field of display technologies, and more particularly to a display panel and a display device.

BACKGROUND

Organic light-emitting diode (OLED) display panels have been widely used in various display devices due to their advantages of self-luminance, small thickness, light weight, high light-emitting efficiency, and the like.

SUMMARY

Embodiments of the present disclosure provide a display panel and a display device.

According to one aspect of the embodiments of the present disclosure, a display panel is provided. The display panel includes:

a base substrate;

a plurality of light-emitting elements disposed on a side of the base substrate;

a plurality of first initial power lines and a plurality of first reset signal lines which are disposed on a side of the base substrate; and a plurality of pixel circuits disposed on a side of the base substrate and arranged in an array, each of the plurality of pixel circuits including a first reset circuit and a drive circuit;

wherein the first reset circuit is coupled with a first reset signal line, a first initial power line, and a driving node, and is configured to transmit a first initial power signal provided by the first initial power line to the driving node in response to a first reset signal provided by the first reset signal line; the drive circuit is coupled with the driving node and a light-emitting element, and is configured to transmit a drive signal to the light-emitting element based on an electric potential of the driving node; and among a plurality of pixel circuits in a same column, first reset circuits included in at least two pixel circuits share a same first initial power line.

Optionally, among all first reset circuits sharing a same first initial power line, a target first reset circuit is coupled with the first initial power line, and the other first reset circuits are coupled with the target first reset circuit.

Optionally, first reset circuits included in every two adjacent pixel circuits share a same first initial power line; and each first reset circuit includes a reset transistor, wherein a gate electrode of the reset transistor is coupled with a first reset signal line; a second electrode of the reset transistor is coupled with a driving node of a pixel circuit to which the reset transistor belongs; and between two reset transistors coupled with a same first initial power line, a first electrode of one reset transistor is coupled with the first initial power line, and a first electrode of the other reset transistor is coupled with a second electrode of the one reset transistor.

Optionally, all first reset circuits sharing a same first initial power line are coupled with the first initial power line.

Optionally, first reset circuits included in every two adjacent pixel circuits share a same first initial power line; and each first reset circuit includes a reset transistor, wherein a gate electrode of the reset transistor is coupled with a first reset signal line; a second electrode of the reset transistor is coupled with a driving node of a pixel circuit to which the reset transistor belongs; and a first electrode of the reset transistor is coupled with the first initial power line.

Optionally, the reset transistor is a single-gate transistor; and an active layer material of the single-gate transistor includes an oxide material.

Optionally, the display panel further includes a plurality of second initial power lines and a plurality of second reset signal lines which are disposed on a side of the base substrate; and each of the plurality of pixel circuits further includes a second reset circuit, wherein the second reset circuits is coupled with a second reset signal line, a second initial power line, and a light-emitting element, and is configured to transmit a second initial power signal provided by the second initial power line to the light-emitting element in response to a second reset signal provided by the second reset signal line.

Optionally, all first reset circuits sharing a same first initial power line are coupled with the first initial power line; and among a plurality of pixel circuits in a same column, second reset circuits included in at least two pixel circuits are coupled with a same second initial power line; and the same first initial power line coupled with the first reset circuits and the same second initial power line coupled with the second reset circuits share a same line.

Optionally, two first reset circuits included in every two adjacent pixel circuits are coupled with a same first initial power line;

two second reset circuits included in every two adjacent pixel circuits are coupled with a same second initial power line; and in every two adjacent pixel circuits, a first reset signal line coupled with a first reset circuit included in one pixel circuit and a second reset signal line coupled with a second reset circuit included in the other pixel circuit share a same line.

Optionally, in every two adjacent pixel circuits, a first reset signal line coupled with a first reset circuit included in one pixel circuit and a first reset signal line coupled with a first reset circuit included in the other pixel circuit share a same line; and in every two adjacent pixel circuits, a second reset signal line coupled with a second reset circuit included in one pixel circuit and a second reset signal line coupled with a second reset circuit included in the other pixel circuit share a same line.

Optionally, among all first reset circuits sharing a same first initial power line, a target first reset circuit is coupled with the first initial power line, and the other first reset circuits are coupled with the target first reset circuit; and in each of the plurality of pixel circuits, the first reset signal line coupled with the first reset circuit and the second reset signal line coupled with the second reset circuit share a same line.

Optionally, the display panel further includes a plurality of data signal lines, a plurality of gate drive lines, a plurality of drive power lines, and a plurality of light-emitting control lines which are disposed on a side of the base substrate;

wherein the drive circuits is further coupled with a data signal lines, a gate drive lines, a drive power lines, and a light-emitting control lines, and is configured to transmit a drive signal to the light-emitting element based on a gate drive signal provided by the gate drive line, a data signal provided by the data signal line, a drive power signal provided by the drive power line, and the electric potential of the driving node; and drive circuits included in at least two pixel circuits sharing a same first initial power line are coupled with different data signal lines.

Optionally, all first reset circuits sharing a same first initial power line are coupled with the first initial power line; and drive circuits included in at least two pixel circuits sharing a same first initial power line are coupled with different drive power lines.

Optionally, among all first reset circuits sharing a same first initial power line, a target first reset circuit is coupled with the first initial power line, and the other first reset circuits are coupled with the target first reset circuit; and drive circuits included in at least two pixel circuits sharing a same first initial power line are coupled with a same drive power line.

According to another aspect of the embodiments of the present disclosure, a display device is provided. The display device includes a power supply assembly and the display panel as defined in the above aspect;

wherein the power supply assembly is coupled with the display panel and is configured to supply power to the display panel.

BRIEF DESCRIPTION OF THE DRAWINGS

To describe the technical solutions in embodiments of the present disclosure more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION

Figure 1:
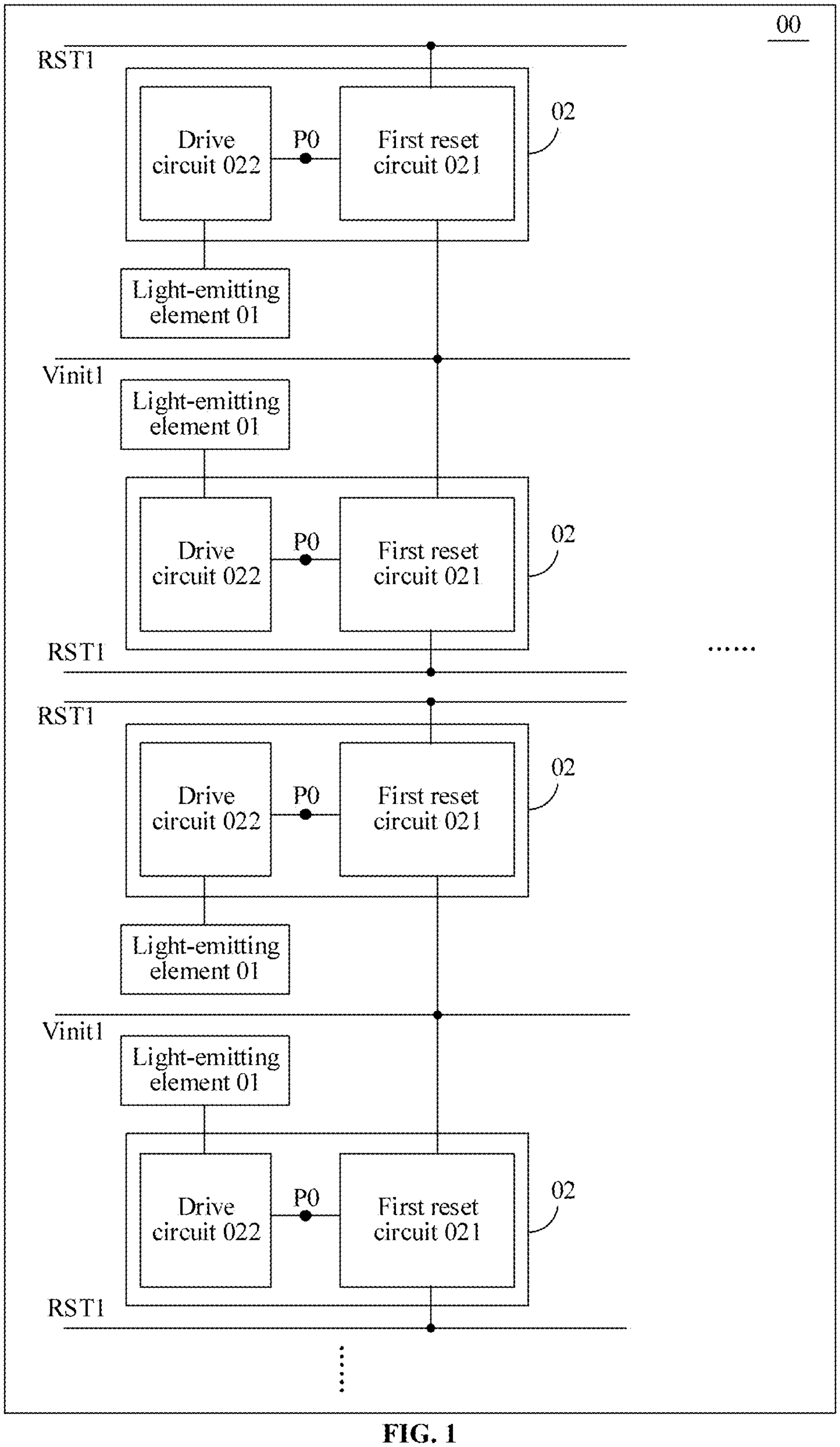
FIG. 1 is a schematic structural diagram of a display panel according to an embodiment of the present disclosure.

For clearer descriptions of the objectives, technical solutions, and advantages of the inventive concept of embodiments of the present disclosure, the inventive concept claimed by the embodiments of the present disclosure is described in detail below with reference to the accompanying drawings and some embodiments.

Transistors used in all embodiments of the present disclosure may be thin film transistors, field effect transistors, or other devices having the same feature. Based on their functions in a circuit, the transistors used in the embodiments of the present disclosure are mainly switching transistors. The source electrode and the drain electrode of the switching transistor used herein are symmetrical, such that the source electrode and the drain electrode can be exchanged. In this embodiment of the present disclosure, the source electrode is referred to as a first electrode; and the drain electrode is referred to as a second electrode. Alternatively, the drain electrode is referred to as a first electrode; and the source electrode is referred to as a second electrode. According to their shapes in the accompanying drawings, a middle end, a signal input end, and a signal output end of the transistor are defined as a gate electrode, a source electrode, and a drain electrode, respectively. In addition, the switching transistor used in the embodiments of the present disclosure may include any one of a P-type switching transistor and an N-type switching transistor. The P-type switching transistor is conducted when the gate electrode is at a low level, and is cut off when the gate electrode is at a high level. The N-type switching transistor is conducted when the gate electrode is at a high level, and is cut off when the gate electrode is at a low level. In addition, a plurality of signals in the embodiments of the present disclosure correspondingly have first electric potentials and second electric potentials. A first electric potential and a second electric potential of a signal only represent two status parameters of the electric potential of the signal, and do not indicate that the first electric potential or the second electric potential in this description has a specific numerical value.

In the related art, an OLED display panel generally includes a base substrate, as well as a plurality of pixel circuits, a plurality of light-emitting elements, and a plurality of signal lines (such as reset signal lines and initial power lines) which are disposed on the base substrate. Each pixel circuit is coupled with a light-emitting element and a plurality of signal lines providing different signals, and is configured to drive the light-emitting element to emit light in response to a signal provided by each signal line.

However, a quantity of signal lines which need to be disposed on the base substrate increases with the resolution of the display panel. Accordingly, an area which needs to be occupied by the signal lines and is of the base substrate becomes larger.

With the development of display technologies, people have increasingly higher requirements on visual experience. An embodiment of the present disclosure provides a display panel. The resolution and the refresh rate of the display panel are both high, such that people's requirements on visual experience can be met. A quantity of pixels per inch (PPI) of the display panel may be used to represent the resolution. In other words, the display panel is a high-PPI display panel.

FIG. 1 is a schematic structural diagram of a display panel according to an embodiment of the present disclosure. As shown in FIG. 1, the display panel may include a base substrate 00; a plurality of light-emitting elements 01 disposed on a side of the base substrate 00; a plurality of first initial power lines Vinit1 and a plurality of first reset signal lines RST1 which are disposed on a side of the base substrate 00; and a plurality of pixel circuits 02 disposed on a side of the base substrate 00 and arranged in an array. Each of the plurality of pixel circuits 02 may include a first reset circuit 021 and a drive circuit 022.

The first reset circuit 021 may be respectively coupled with (namely, electrically coupled with) a first reset signal line RST1, a first initial power line Vinit1, and a driving node P0. The first reset circuit 021 may be configured to transmit a first initial power signal provided by the first initial power line Vinit1 to the driving node P0 in response to a first reset signal provided by the first reset signal line RST1.

For example, when the electric potential of the first reset signal provided by the first reset signal line RST1 is a first electric potential, the first reset circuit 021 may transmit the first initial power signal provided by the first initial power line Vinit1 to the driving node P0, thereby resetting the driving node P0. The electric potential of the first initial power signal may be a second electric potential. The first electric potential may be a valid electric potential, and the second electric potential may be an invalid electric potential. The valid electric potential may be lower than the invalid electric potential.

The drive circuit 022 may be respectively coupled with the driving node P0 and a light-emitting element 01. The drive circuit 022 may be configured to transmit a drive signal to the light-emitting element 01 based on an electric potential of the driving node P0.

For example, the first reset circuit 021 transmits the first initial power signal to the driving node P0, such that the driving node P0 may be reset in the reset phase. The drive circuit 022 may include a data-writing sub-circuit and a drive sub-circuit. In a data-writing phase after the reset phase, the data-writing sub-circuit may charge the driving node P0 under the control of each signal line coupled with the data-writing sub-circuit. In a light-emitting phase after the data-writing phase, the drive sub-circuit in the drive circuit 022 may transmit the drive signal (for example, a drive current) to the light-emitting element 01 based on the electric potential of the driving node P0, thereby driving the light-emitting element 01 to emit light.

In this embodiment of the present disclosure, among a plurality of pixel circuits 02 in a same column, first reset circuits 021 included in at least two pixel circuits 02 may share a same first initial power line Vinit1. In other words, first initial power lines Vinit1 coupled with at least two first reset circuits 021 in a same column may be the same.

For example, in the display panel shown in FIG. 1, among a plurality of pixel circuits 02 in a same column, first reset circuits 021 included in every two adjacent pixel circuits 02 are coupled with a same first initial power line Vinit1. The following uses the first column as an example. Referring to FIG. 1, it can be seen that a first reset circuit 021 included in a first pixel circuit 02 in the first row and a first reset circuit 021 included in a second pixel circuit 02 in the second row share a same first initial power line Vinit1, that a first reset circuit 021 included in a third pixel circuit 02 in the third row and a first reset circuit 021 included in a fourth pixel circuit 02 in the fourth row share a same first initial power line Vinit1, and by analogy. In this way, compared with the related art in which all first reset circuits 021 in pixel circuits 02 are coupled with different first initial power lines Vinit1, a quantity of first initial power lines Vinit1 which need to be disposed on the base substrate 00 can be reduced by half. Therefore, an area which needs to be occupied by the first initial power lines Vinit1 and is of the base substrate is reduced. On the premise that the area of the base substrate is fixed, compared with the related art, a greater quantity of pixel circuits 02 may be disposed on the base substrate 00) described in this embodiment of the present disclosure, that is, the resolution of the display panel described in this embodiment of the present disclosure is higher.

In summary, a display panel is provided in the embodiment of the present disclosure. The display panel includes a base substrate and a plurality of pixel circuits disposed on the base substrate. At least two pixel circuits in a same column are coupled with a same first initial power line, such that only a small quantity of signal lines need to be disposed on the base substrate. Accordingly, an area which needs to be occupied by the signal lines and is of the base substrate becomes smaller, thereby facilitating high-resolution design of the display panel.

Figure 2:
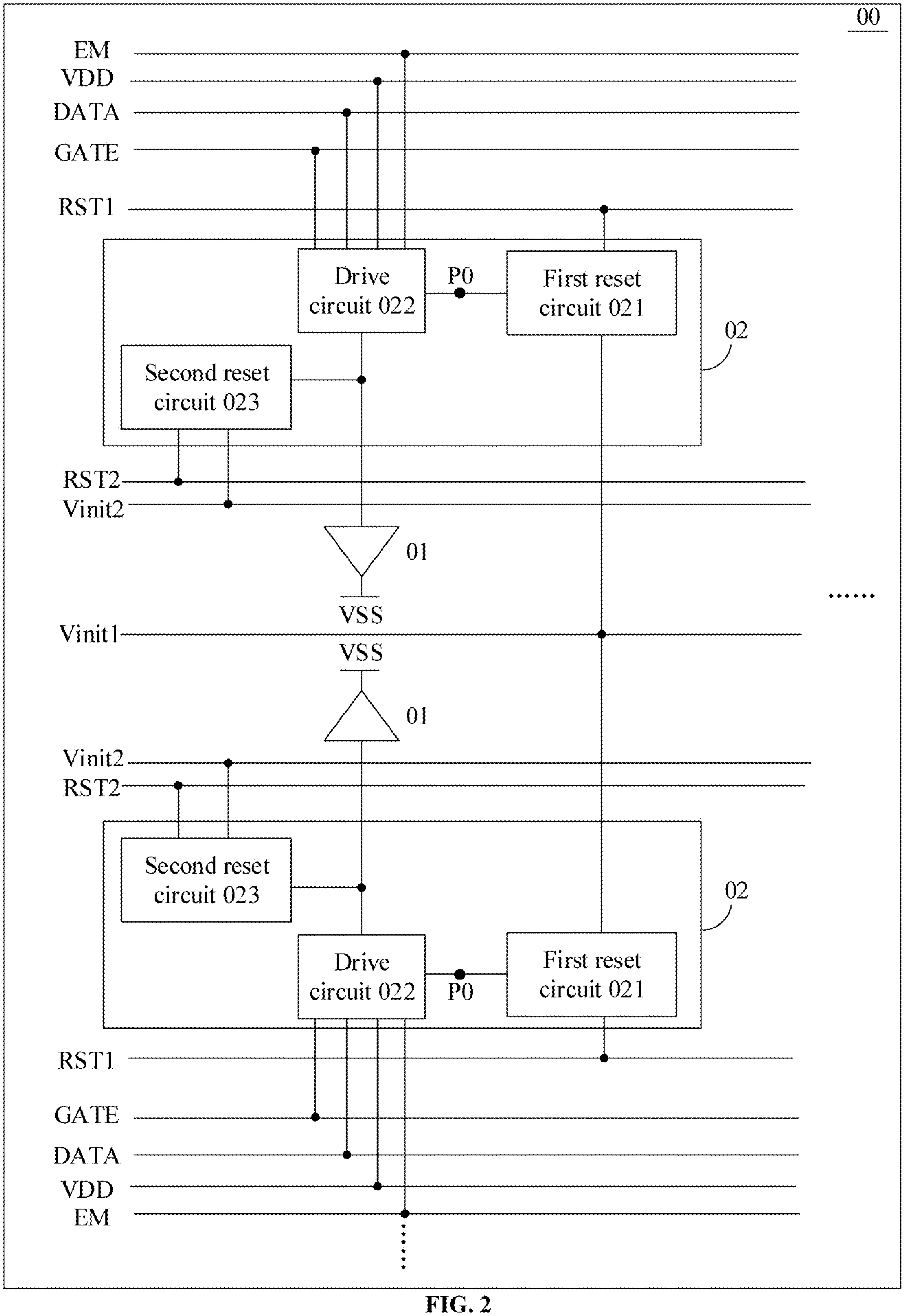
FIG. 2 is a schematic structural diagram of another display panel according to an embodiment of the present disclosure.

FIG. 2 is a schematic structural diagram of another display panel according to an embodiment of the present disclosure. As shown in FIG. 2, the display panel may further include a plurality of second reset signal lines RST2 and a plurality of second initial power lines Vinit2 which are disposed on a side of the base substrate 00. The pixel circuit 02 may further include a second reset circuit 023.

The second reset circuit 023 may be respectively coupled with a second reset signal line RST2, a second initial power line Vinit2, and a light-emitting element 01. The second reset circuit 023 may be configured to transmit a second initial power signal provided by the second initial power line Vinit2 to the light-emitting element 01 in response to a second reset signal provided by the second reset signal line RST2.

For example, referring to FIG. 2, the second reset circuit 023 shown in this figure is coupled with the anode of the light-emitting element 01, and the cathode of the light-emitting element 01 is coupled with a pull-down power end VSS. When the electric potential of the second reset signal provided by the second reset signal line RST2 is a first electric potential, the second reset circuit 023 may transmit the second initial power signal provided by the second initial power line Vinit2 to the light-emitting element 01, thereby resetting the light-emitting element 01. The electric potential of the second initial power signal may be a second electric potential.

Still referring to FIG. 2, it can be seen that the display panel may further include a plurality of data signal lines DATA, a plurality of gate drive lines GATE, a plurality of drive power lines VDD, and a plurality of light-emitting control lines EM.

The drive circuit 022 may be respectively coupled with a data signal line DATA, a gate drive line GATE, a drive power line VDD, and a light-emitting control line EM. The drive circuit 02 may be configured to transmit a drive signal to the light-emitting element 01 based on a gate drive signal provided by the gate drive line GATE, a data signal provided by the data signal line DATA, a drive power signal provided by the drive power line VDD, and the electric potential of the driving node P0.

Figure 3:
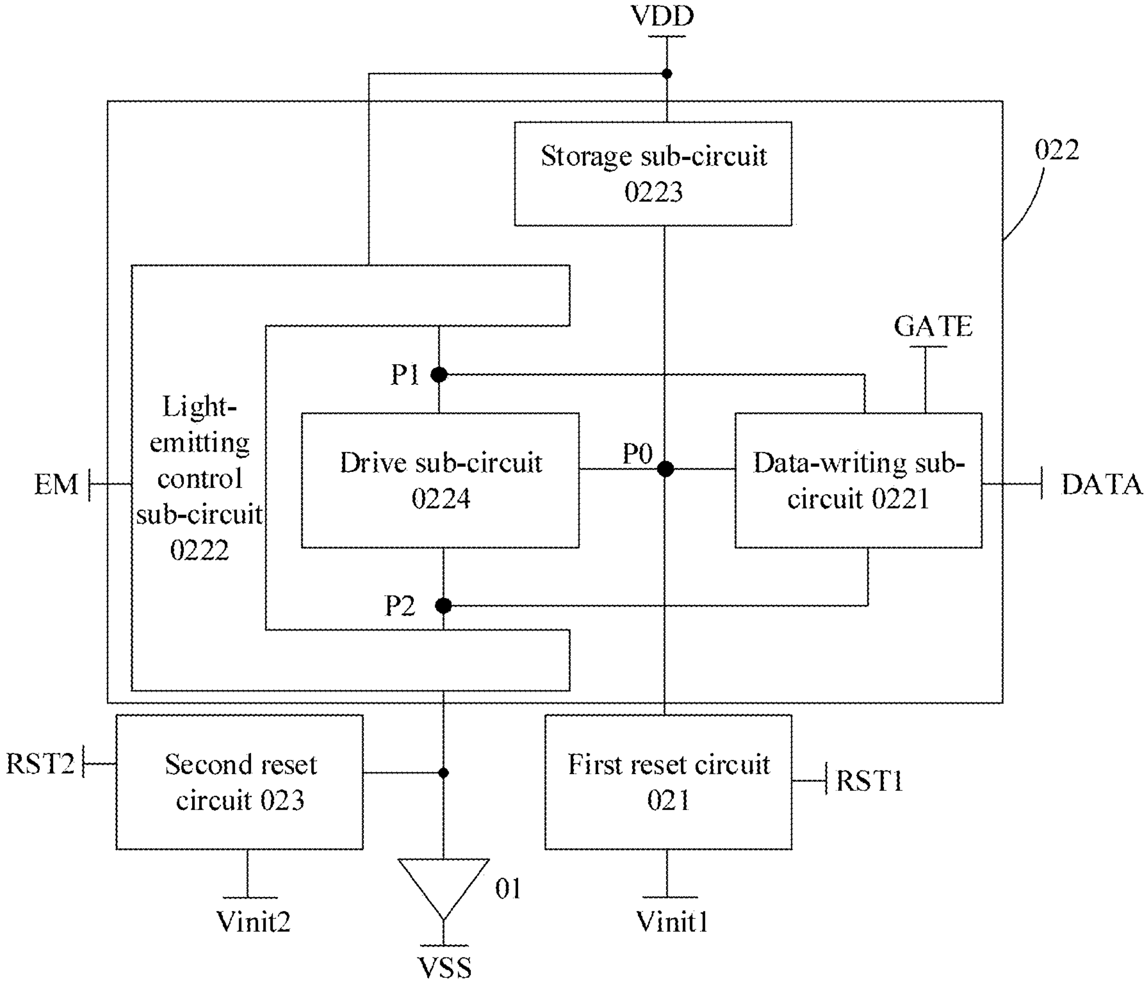
FIG. 3 is a schematic structural diagram of a pixel circuit according to an embodiment of the present disclosure.

In some embodiments, referring to the structure of a pixel circuit 02 shown in FIG. 3, it can be seen that the drive circuit 022 may include a data-writing sub-circuit 0221, a light-emitting control sub-circuit 0222, a storage sub-circuit 0223, and a drive sub-circuit 0224.

The data-writing sub-circuit 0221 may be respectively coupled with a driving node P0, a gate drive line GATE, a data signal line DATA, a first node P1, and a second node P2. The data-writing sub-circuit 0221 may be configured to transmit a data signal provided by the data signal line DATA to the first node P1 in response to a gate drive signal which is of the first electric potential and is provided by the gate drive line GATE, and adjust the electric potential of the driving node P0 based on the electric potential of the second node P2.

The light-emitting control sub-circuit 0222 may be respectively coupled with a light-emitting control line EM, a drive power line VDD, the first node P1, the second node P2, and an anode of the light-emitting element 01. The light-emitting control sub-circuit 0222 may be configured to transmit a drive power signal provided by the drive power line VDD to the first node P1 in response to a light-emitting control signal which is of the first electric potential and is provided by the light-emitting control line EM, and control the second node P2 to be conducted with the light-emitting element 01.

The storage sub-circuit 0223 may be respectively coupled with the drive power line VDD and the driving node P0. The storage sub-circuit 0223 may adjust the electric potential of the driving node P0 based on a drive power signal provided by the drive power line VDD.

The drive sub-circuit 0224 may be respectively coupled with the first node P1, the second node P2, and the driving node P0. The drive sub-circuit 0224 may transmit a drive signal to the second node P2 based on the electric potential of the first node P1 and the electric potential of the driving node P0. After the light-emitting control sub-circuit 0222 conducts the second node P2 with the light-emitting element 01, the drive signal transmitted by the drive sub-circuit 0224 to the second node P2 can be further transmitted to the light-emitting element 01, such that the light-emitting element 01 emits light based on the drive signal.

As an optional embodiment, in this embodiment of the present disclosure, among all first reset circuits 021 sharing a same first initial power line Vinit1, a target first reset circuit 021 may be directly coupled with the first initial power line Vinit1, and the other first reset circuits 021 may be coupled with the target first reset circuit 021, that is, the other first reset circuits 021 may be indirectly coupled with the first initial power line Vinit1 through the target first reset circuit 021.

Figure 4:
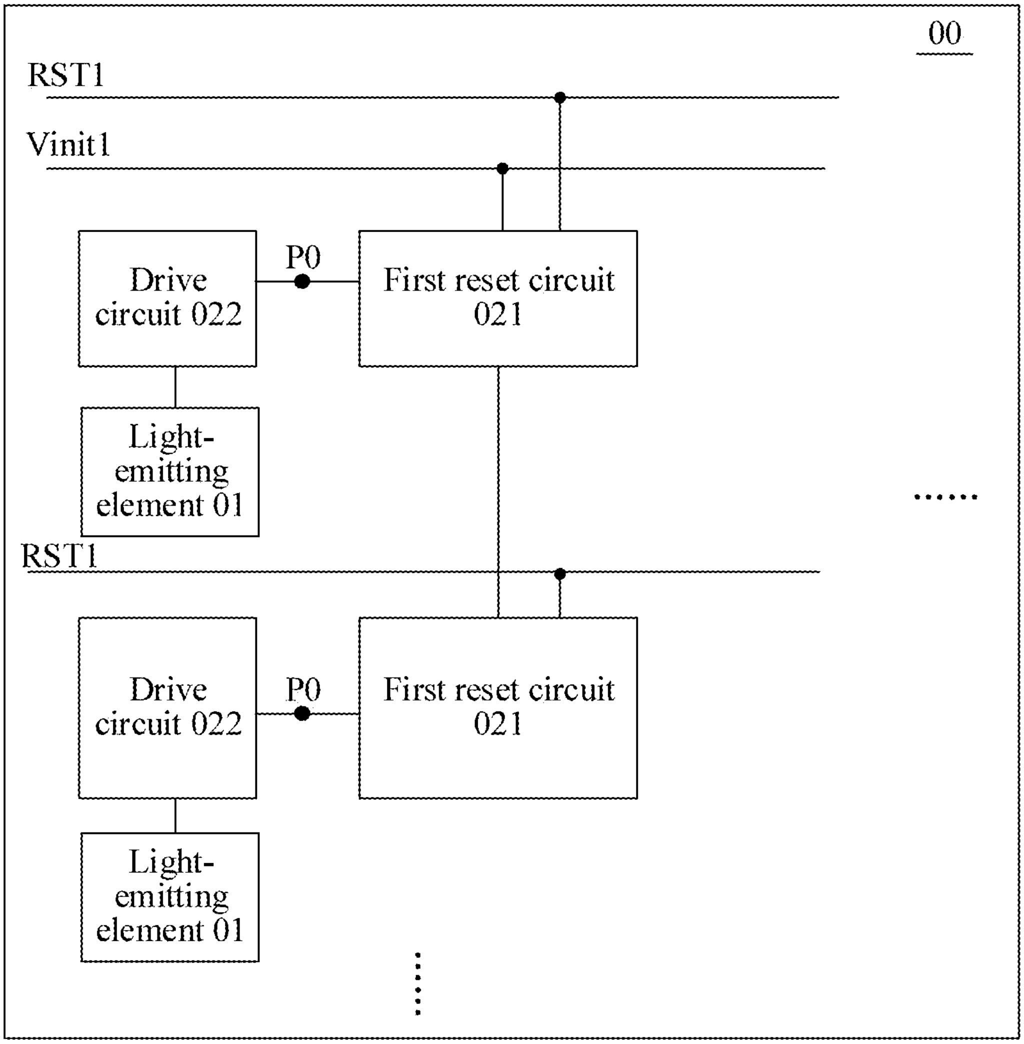
FIG. 4 is a schematic structural diagram of still another display panel according to an embodiment of the present disclosure.

For example, two first reset circuits 021 of two adjacent pixel circuits 02 in a same column share a same first initial power line Vinit1. FIG. 4 is a schematic structural diagram of still another display panel. As shown in FIG. 4, a first reset circuit 021 of a pixel circuit 02 in the first row is directly coupled with a first initial power line Vinit1; and a first reset circuit 021 of a pixel circuit 02 in the second row is directly coupled with the first reset circuit 021 of the pixel circuit 02 in the first row. Thus, it can be determined that the first reset circuit 021 of the pixel circuit 02 in the first row is the target first reset circuit. In addition, structures of the drive circuits 022 and the light-emitting elements 01 are not shown in FIG. 4.

Figure 5:
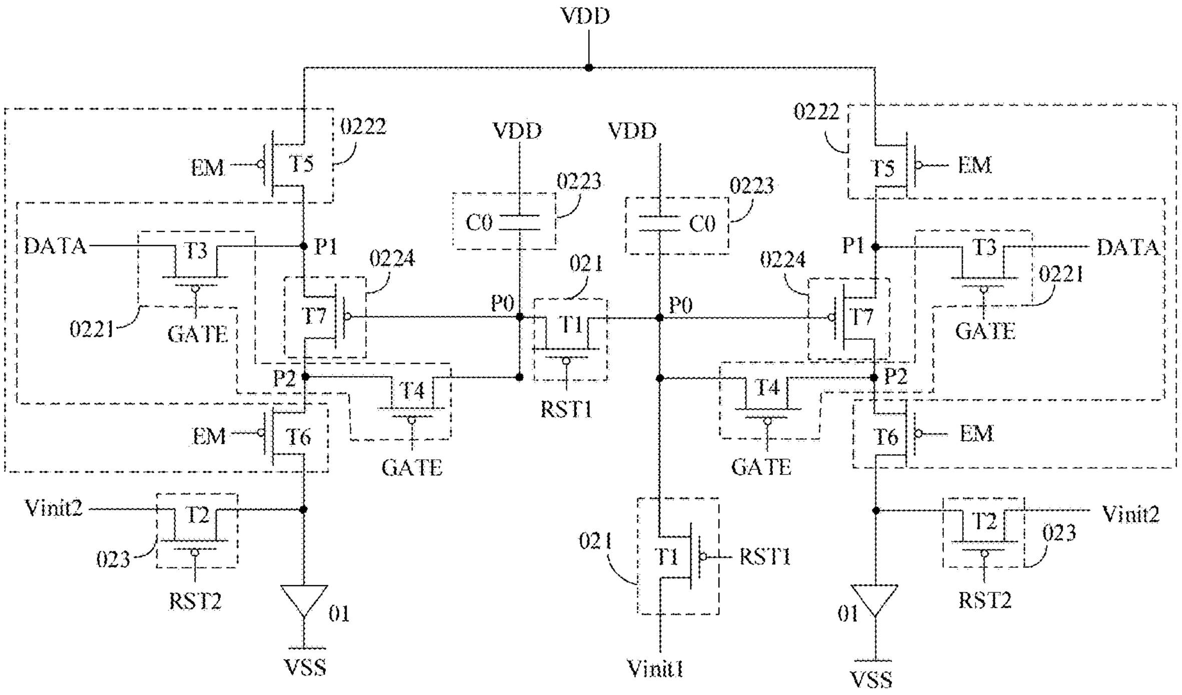
FIG. 5 is a schematic structural diagram of another pixel circuit according to an embodiment of the present disclosure.

Using the structure shown in FIG. 4 as an example, FIG. 5 shows a schematic circuit diagram of two pixel circuits 02 in a same column. As shown in FIG. 5, each first reset circuit 021 may include a reset transistor T1.

The gate electrode of the reset transistor T1 may be coupled with the first reset signal line RST1. The second electrode of the reset transistor T1 may be coupled with a driving node P0 of the pixel circuit 02 to which the reset transistor T1 belongs. Between two reset transistors T1 coupled with a same first initial power line Vinit1, the first electrode of one reset transistor T1 may be coupled with the first initial power line Vinit1, and the first electrode of the other reset transistor T1 is coupled with the second electrode of the one reset transistor T1.

As another optional embodiment, in this embodiment of the present disclosure, all first reset circuits 021 sharing a same first initial power line Vinit1 may be coupled with the first initial power line Vinit1.

For example, referring to the display panel shown in FIG. 1, both a first reset circuit 021 of a pixel circuit 02 in the first row and a first reset circuit 021 of a pixel circuit 02 in the second row are directly coupled with a same first initial power line Vinit1.

Figure 6:
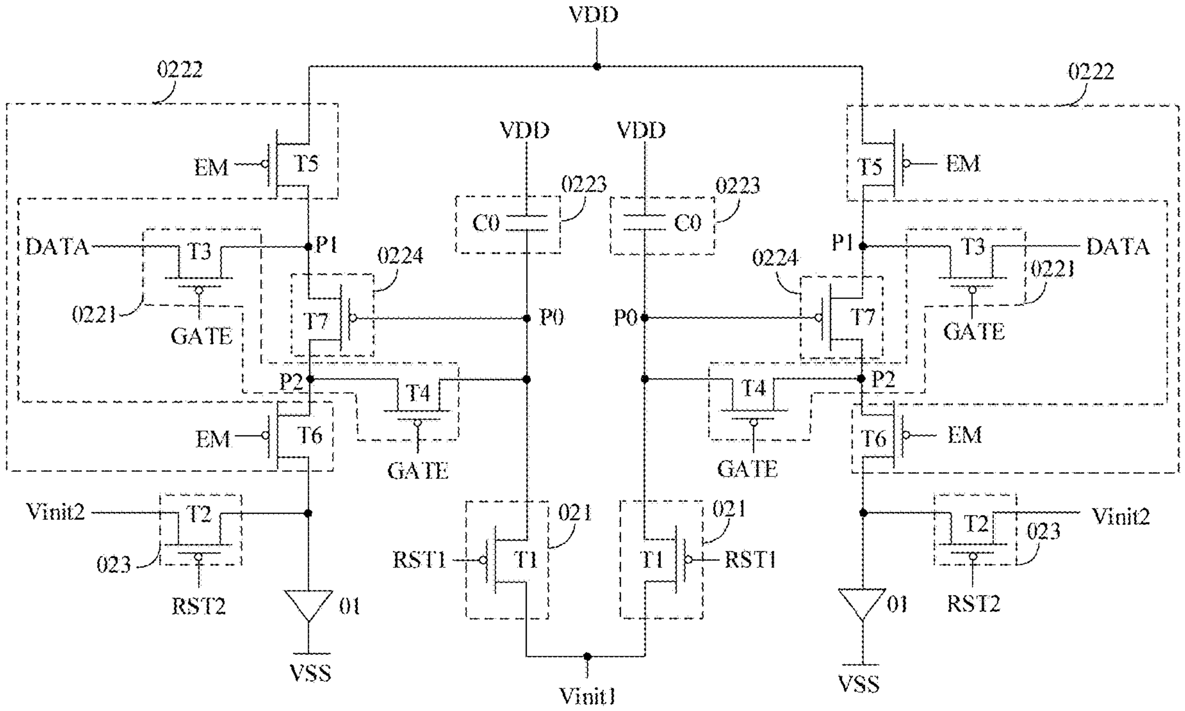
FIG. 6 is a schematic structural diagram of still another pixel circuit according to an embodiment of the present disclosure.

Using the structure shown in FIG. 1 as an example, FIG. 6 shows another schematic circuit diagram of two pixel circuits in a same column. As shown in FIG. 6, each first reset circuit 021 may include a reset transistor T1.

Between two reset transistors T1 coupled with a same first initial power line Vinit1, the gate electrode of each reset transistor T1 may be coupled with the first reset signal line RST1, the second electrode of each reset transistor T1 may be coupled with a driving node P0 of the pixel circuit 02 to which the reset transistor T1 belongs, and the first electrode of each reset transistor T1 may be coupled with the first initial power line Vinit1.

In some embodiments, the reset transistor T1 included in the first reset circuit 021 may be a single-gate transistor. The active layer material of the single-gate transistor may include an oxide material. For example, the single-gate transistor may be manufactured according to a low-temperature poly-crystalline oxide (LTPO) technology. In this way, compared with a reset transistor T1 using a double-gate transistor, the reset transistor T1 using the single-gate transistor has the following advantages: The electric leakage degree of the reset transistor T1 is reduced; and an area which is occupied by the reset transistor T1 and is of the base substrate 00 is reduced. Accordingly, the PPI of the display panel may be further improved.

In addition, with reference to FIG. 5 and FIG. 6, it can be seen that in each pixel circuit 02, the second reset circuit 023 may include a reset transistor T2; in the drive circuit 022, the data-writing sub-circuit 0221 may include a data-writing transistor T3 and a compensation transistor T4; the light-emitting control sub-circuit 0222 may include a first light-emitting control transistor T5 and a second light-emitting control transistor T6; the storage sub-circuit 0223 may include a storage capacitor C0; and the drive sub-circuit 0224 may include a drive transistor T7.

The gate electrode of the reset transistor T2 may be coupled with the second reset signal line RST2. The first electrode of the reset transistor T2 may be coupled with the second initial power line Vinit2. The second electrode of the reset transistor T2 may be coupled with the anode of the light-emitting element 01.

The gate electrode of the data-writing transistor T3 and the gate electrode of the compensation transistor T4 may be both coupled with the gate drive line GATE. The first electrode of the data-writing transistor T3 may be coupled with the data signal line DATA. The second electrode of the data-writing transistor T3 may be coupled with the first node P1. The first electrode of the compensation transistor T4 may be coupled with the second node P2. The second electrode of the compensation transistor T4 may be coupled with the driving node P0.

The gate electrode of the first light-emitting control transistor T5 and the gate electrode of the second light-emitting control transistor T6 may be both coupled with the light-emitting control line EM. The first electrode of the first light-emitting control transistor T5 may be coupled with the drive power line VDD. The second electrode of the first light-emitting control transistor T5 may be coupled with the first node P1. The first electrode of the second light-emitting control transistor T6 may be coupled with the second node P2. The second electrode of the second light-emitting control transistor T6 may be coupled with the anode of the light-emitting element 01.

One end of the storage capacitor C0 may be coupled with the driving node P0, and the other end of the storage capacitor C0 may be coupled with the drive power line VDD.

The gate electrode of the drive transistor T7 may be coupled with the driving node P0. The first electrode of the drive transistor T7 may be coupled with the drive power line VDD. The second electrode of the drive transistor T7 may be coupled with the second node P2.

In some embodiments, on the premise that first reset circuits 021 of at least two pixel circuits 02 share one first initial power line Vinit1 in the manner shown in FIG. 1, among a plurality of pixel circuits 02 in a same column, second reset circuits 023 included in at least two pixel circuits 02 may be coupled with a same second initial power line Vinit2. The same first initial power line Vinit1 coupled with the first reset circuits 021 and the same second initial power line Vinit2 coupled with the second reset circuits 023 may share a same line. In other words, among at least two pixel circuits 02 in a same column, the second reset circuits 023 of the pixel circuits 02 share one second initial power line Vinit2; and the shared second initial power line Vinit2 and the first initial power line Vinit1 shared by the first reset circuits 021 of the at least two pixel circuit 02 are the same initial power line. In this way, an area which needs to be occupied by signal lines and is of the base substrate 00 can be further reduced, and the design of the display panel with high-PPI is further facilitated.

Figure 7:
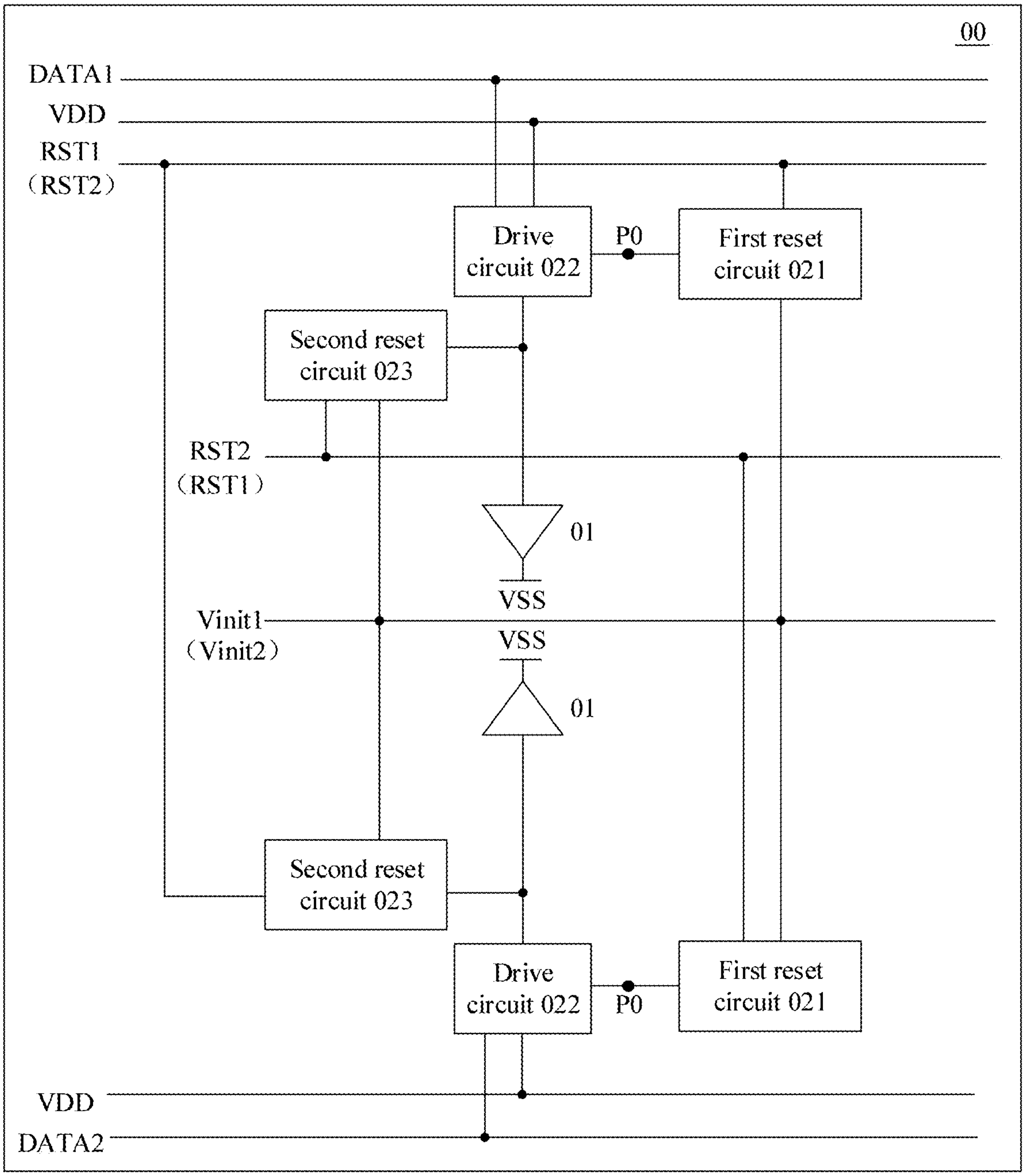
FIG. 7 is a schematic structural diagram of yet another display panel according to an embodiment of the present disclosure.

For example, referring to yet another display panel shown in FIG. 7, it can be seen that in two adjacent pixel circuits 02 in a same column, two first reset circuits 021 are coupled with a same first initial power line Vinit1; two second reset circuits 023 are coupled with a same second initial power line Vinit2; and the first initial power line Vinit1 and the second initial power line Vinit2 are a same signal line.

Still referring to the display panel shown in FIG. 7, it can be seen that in every two adjacent pixel circuits 02, a first reset signal line RST1 coupled with a first reset circuit 021 included in one pixel circuit 02 and a second reset signal line RST2 coupled with a second reset circuit 023 included in the other pixel circuit 02 may share a same line. In other words, two first reset circuits 021 and two second reset circuits 023 included in every two adjacent pixel circuits 02 only need to be coupled with two reset signal lines in total. Compared with the related art in which all first reset circuits 021 in pixel circuits 02 are coupled with different first reset signal lines RST1 and all second reset circuits 023 in the pixel circuits 02 are coupled with different second reset signal lines RST2, a quantity of first reset signal lines RST1 and a quantity of second reset signal lines RST2 which need to be disposed on the base substrate 00 can be both reduced by half. In this way, an area which needs to be occupied by signal lines and is of the base substrate 00 can be further reduced, and the design of the display panel with high-PPI is further facilitated.

Figure 8:
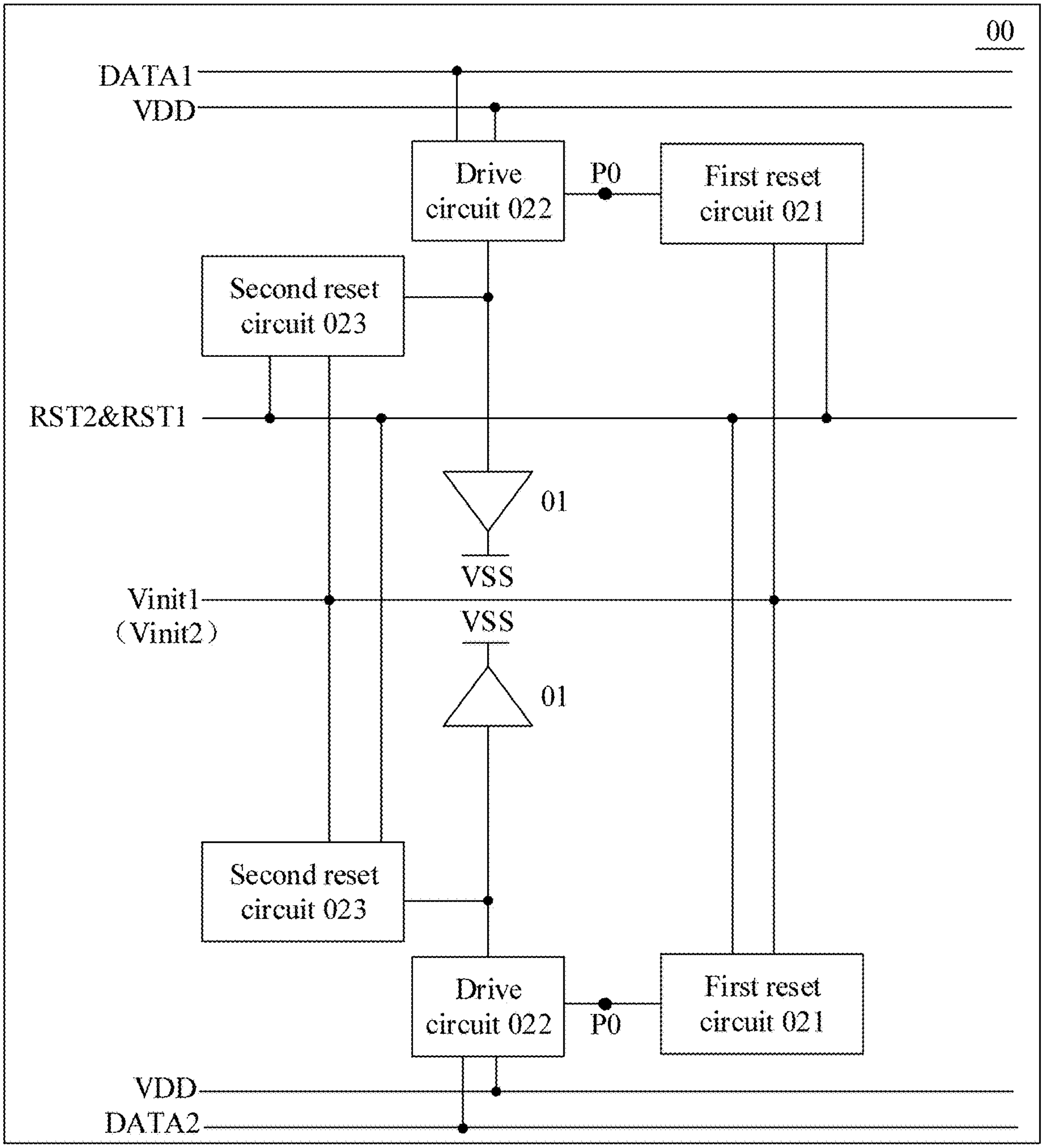
FIG. 8 is a schematic structural diagram of yet another display panel according to an embodiment of the present disclosure.

Based on the structure shown in FIG. 7, FIG. 8 shows a schematic structural diagram of yet another display panel. Referring to FIG. 8, it can be seen that in every two adjacent pixel circuits 02, a first reset signal line RST1 coupled with a first reset circuit 021 included in one pixel circuit 02 and a first reset signal line RST1 coupled with a first reset circuit 021 included in the other pixel circuit 02 share a same line.

In addition, a second reset signal line RST2 coupled with a second reset circuit 023 included in one pixel circuit 02 and a second reset signal line RST2 coupled with a second reset circuit 023 included in the other pixel circuit 02 share a same line. In other words, referring to FIG. 8, it can be seen that two first reset circuits 021 and two second reset circuits 023 included in every two adjacent pixel circuits 02 only need to be coupled with one reset signal line. Compared with the related art described above, the total quantity of first reset signal lines RST1 and second reset signal lines RST2 which need to be disposed on the base substrate 00 can be reduced to ¼. In this way, an area which needs to be occupied by signal lines and is of the base substrate 00 can be further reduced, and the design of the display panel with high-PPI is further facilitated.

In addition, based on the structures shown in FIG. 7 and FIG. 8, drive circuits 022 included in at least two pixel circuits 02 sharing a same first initial power line Vinit1 may be coupled with different drive power lines VDD. For example, it can be seen that in the two adjacent pixel circuits 02 shown in FIG. 7 and FIG. 8, a drive circuit 022 included in one pixel circuit 02 is coupled with a drive power line VDD; and a drive circuit 022 included in the other pixel circuit 02 is coupled with another drive power line VDD.

Figure 9:
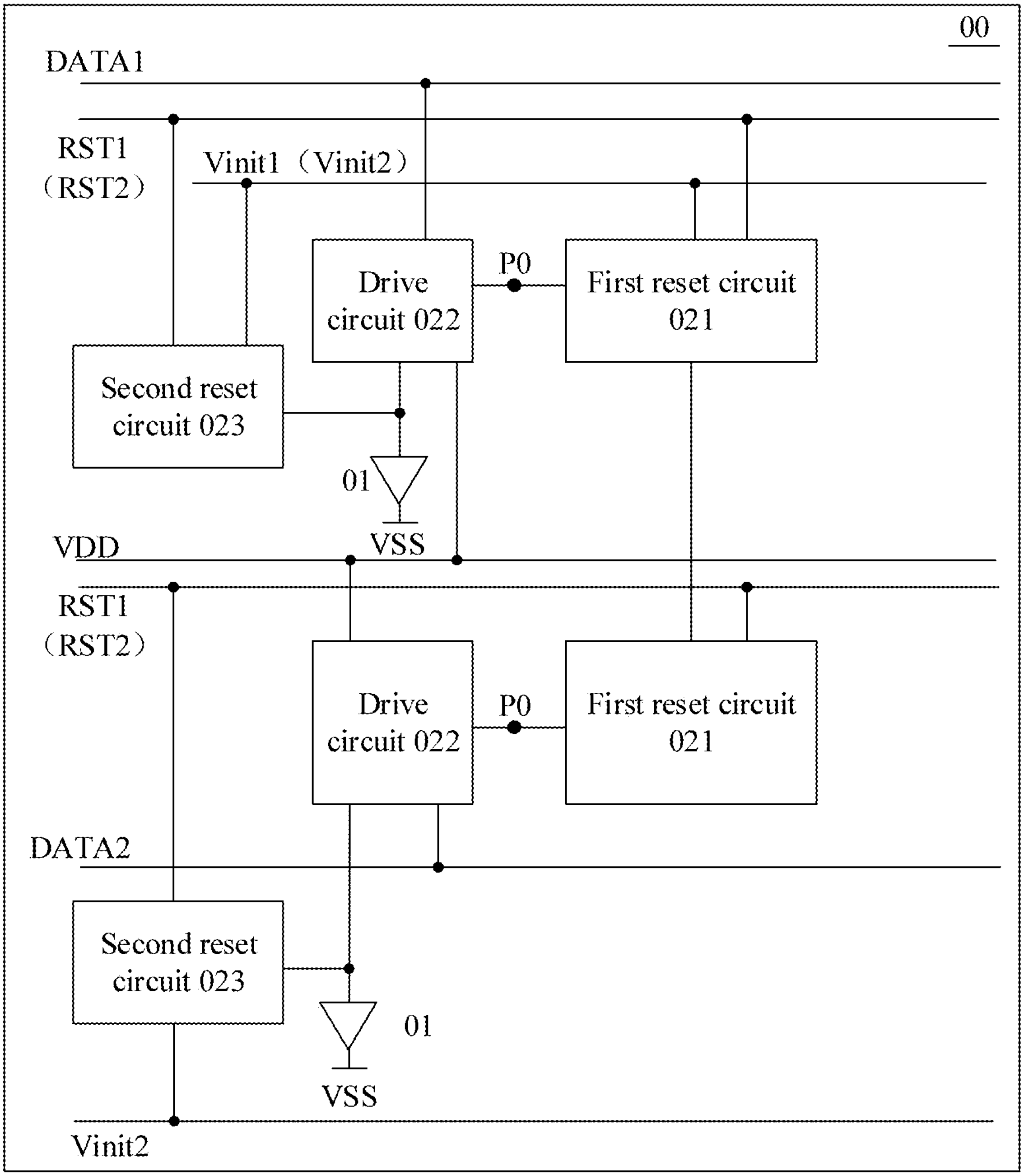
FIG. 9 is a schematic structural diagram of yet another display panel according to an embodiment of the present disclosure.

Based on the structure shown in FIG. 4, FIG. 9 shows a schematic structural diagram of yet another display panel. Referring to FIG. 9, it can be seen that on the premise that first reset circuits 021 of at least two pixel circuits 02 share one first initial power line Vinit1 in the manner shown in FIG. 4, in each pixel circuit 02, a first reset signal line RST1 coupled with the first reset circuit 021 and a second reset signal line RST2 coupled with the second reset circuit 023 may share a same line. In other words, the first reset circuit 021 and the second reset circuit 023 of each pixel circuit 02 may be coupled with a same reset signal line. In this way, an area which needs to be occupied by signal lines and is of the base substrate 00 can be further reduced, and the design of the display panel with high-PPI is further facilitated.

Moreover, referring to FIG. 9, it can be further seen that based on the structure shown in FIG. 4, a first initial power line Vinit1 coupled with a first reset circuit 021 of a pixel circuit 02 in the first row and a second initial power line Vinit2 coupled with a second reset circuit 023 of the pixel circuit 02 share a same line. A second reset circuit 023 of a pixel circuit 02 in the second row is independently coupled with a second initial power line Vinit2.

In addition, based on the structure shown in FIG. 9, drive circuits 022 included in at least two pixel circuits 02 sharing a same first initial power line Vinit1 are coupled with a same drive power line VDD. For example, it can be seen that two drive circuits 022 included in two adjacent pixel circuits 02 shown in FIG. 9 are coupled with a same drive power line VDD.

In addition, in this embodiment of the present disclosure, drive circuits 022 included in at least two pixel circuits 02 sharing a same first initial power line Vinit1 are coupled with different data signal lines DATA. For example, it can be further seen that in the two adjacent pixel circuits 02 shown in FIG. 7 to FIG. 9, a drive circuit 022 included in one pixel circuit 02 is coupled with a data signal line DATA1; and a drive circuit 022 included in the other pixel circuit 02 is coupled with another data signal line DATA2.

It should be noted that, neither a specific structure of the drive circuit 022 nor a light-emitting control line EM and a data signal line DATA which are coupled with the drive circuit 022 are shown in the display panels shown in FIG. 7 to FIG. 9. In addition, FIG. 7 to FIG. 9 only show structures of two adjacent pixel circuits 02 in a same column.

In some embodiments, each pixel circuit 02 may generally include: (1) a semiconductor layer disposed on a side of the base substrate 00, wherein the semiconductor layer may be configured to form an active layer of each transistor in the pixel circuit; (2) a first gate metal layer disposed on a side of the base substrate 00, wherein the first gate metal layer may be configured to form the gate electrode of each transistor and a capacitor plate of the storage capacitor C0; with reference to FIG. 5 and FIG. 6, the gate electrode of each transistor may be coupled with a corresponding signal line; and the gate electrode of each transistor may be overlapped with a channel region of the transistor; (3) a second gate metal layer disposed on a side of the base substrate 00, wherein the second gate metal layer may be configured to form another capacitor plate of the storage capacitor C0, as well as some signal lines (such as the first initial power line Vinit1) with which the pixel circuit 02 needs to be coupled; (4) a first source-drain metal layer and a second source-drain metal layer which are disposed on a side of the base substrate 00, wherein the first source-drain metal layer and the second source-drain metal layer may be configured to form some signal lines (such as the data signal line DATA) with which the pixel circuit 02 needs to be coupled, and connect two layers which need to be connected; and (5) an insulation layer disposed between every two adjacent metal layers. In some embodiments, the semiconductor layer, the first gate metal layer, the second gate metal layer, the first source-drain metal layer, and the second source-drain metal layer may be generally stacked in a direction distal from the base substrate 00 in sequence.

The active layer may include a channel region, as well as a source region and a drain region disposed on two sides of the channel region. The channel region may be undoped; or a doped type of the channel region is different from that of the source region and the drain region, such that the channel region has the feature of a semiconductor. Both the source region and the drain region may be doped, thereby having electrical conductivity. An impurity used for doping may vary with the type of a transistor (namely, N-type or P-type). Moreover, the source electrode of each transistor may be coupled with the source region; and the drain electrode of the transistor may be coupled with the drain region.

Figure 10:
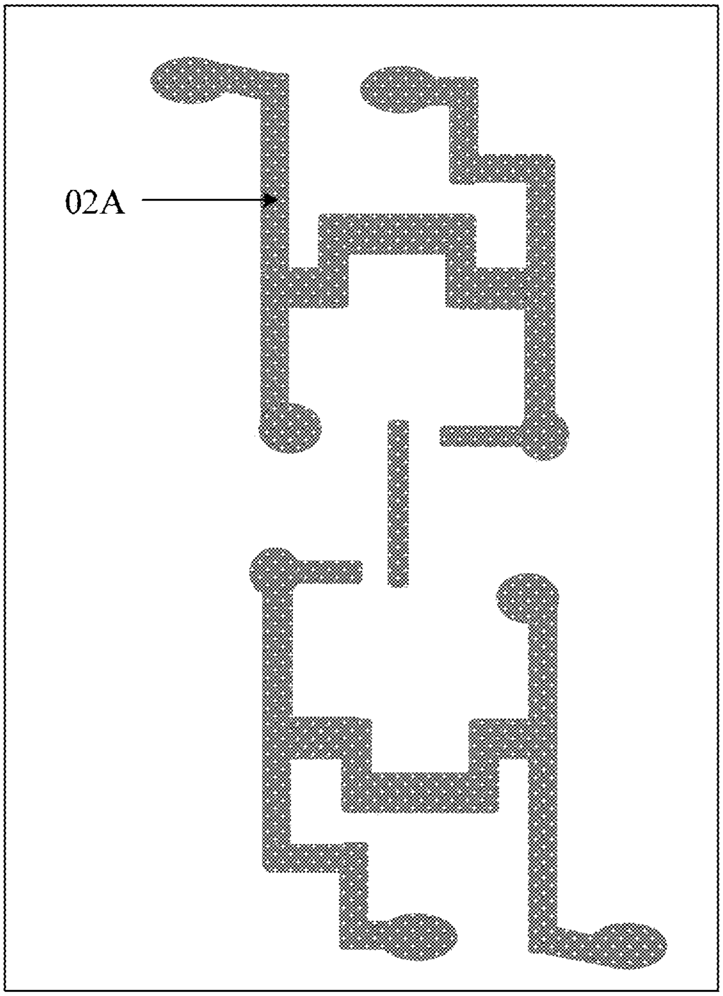
FIG. 10 is a structural layout of a semiconductor layer according to an embodiment of the present disclosure.

With reference to the above description of the pixel circuit and using the structure shown in FIG. 7 as an example, FIG. 10 shows a semiconductor layer 02A included in two adjacent pixel circuits 02. Based on FIG. 10, FIG. 11 further shows a first gate metal layer 02B included in the two adjacent pixel circuits 02. Based on FIG. 11, FIG. 12 further shows a second gate metal layer 02C included in the two adjacent pixel circuits 02. Based on FIG. 12, FIG. 13 further shows a first source-drain metal layer 02D and a second source-drain metal layer 02E included in the two adjacent pixel circuits 02. In addition, with reference to FIG. 6, FIG. 13 further shows an optional location of each transistor on the layout.

Referring to FIG. 10, it can be seen that the semiconductor layer configured to form two adjacent pixel circuits 02 includes three independent parts.

Figure 11:
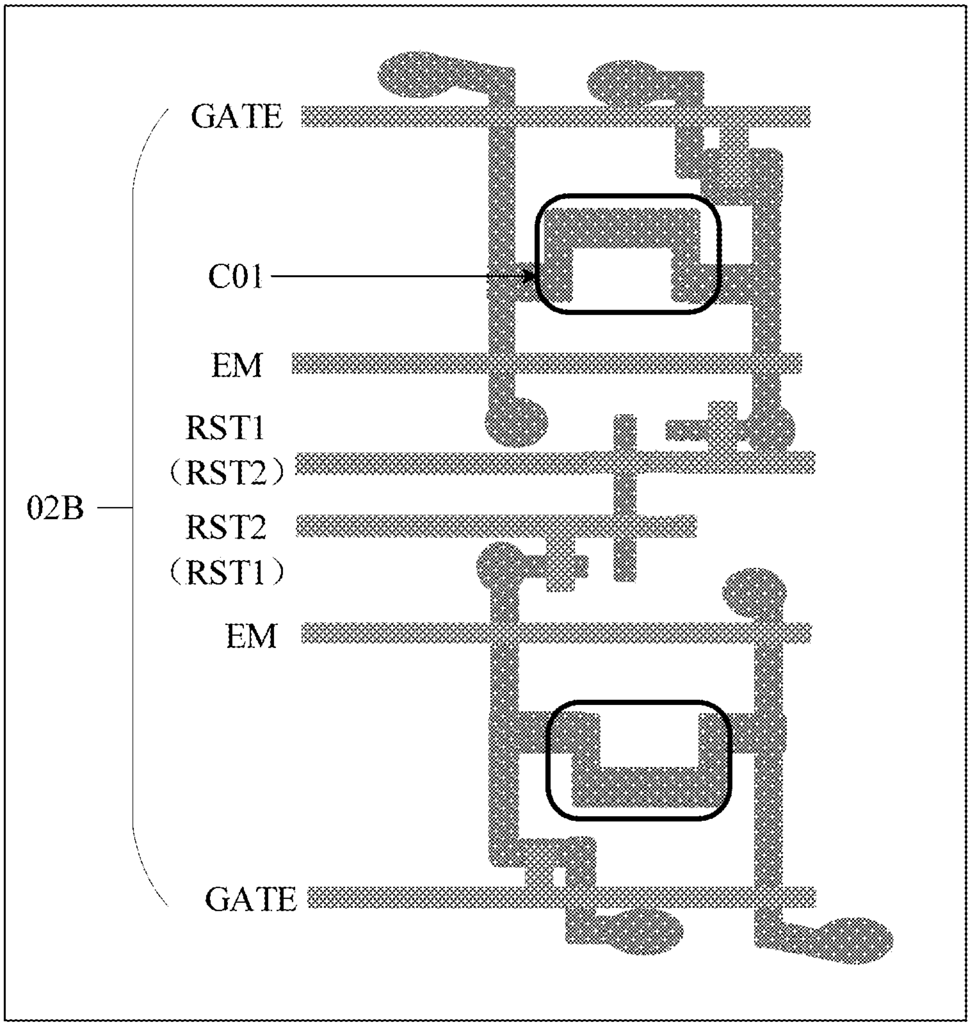
FIG. 11 is a structural layout showing a semiconductor layer and a first gate metal layer according to an embodiment of the present disclosure.
Figure 13:
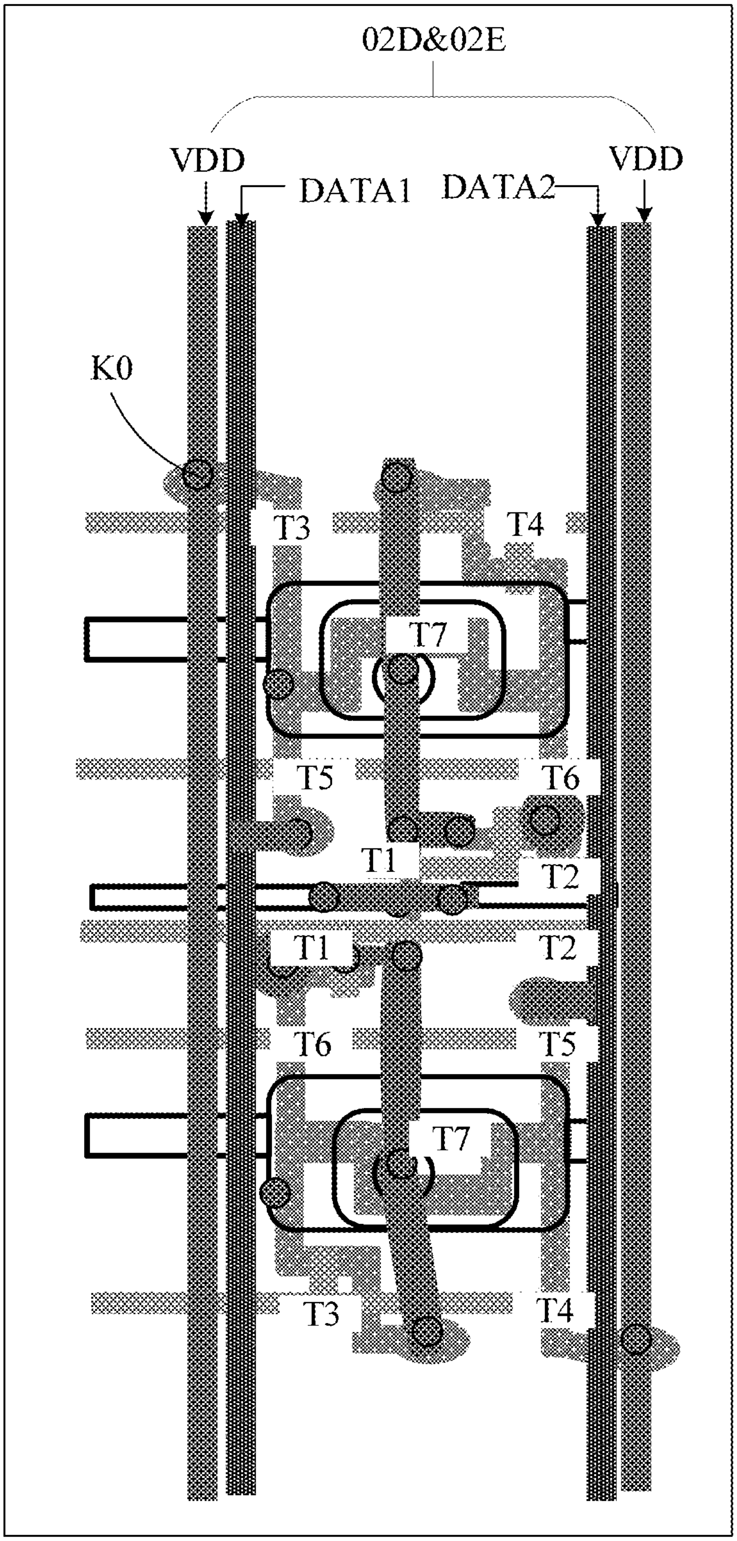
FIG. 13 is a structural layout showing a semiconductor layer, a first gate metal layer, a second gate metal layer, a first source-drain metal layer, and a second source-drain metal layer according to an embodiment of the present disclosure.

Referring to FIG. 11 and FIG. 13, it can be seen that the first gate metal layer 02B can be configured to form a gate electrode coupled with a gate drive line GATE (namely, a data-writing transistor T3 and a compensation transistor T4), a capacitor plate C01, a gate electrode coupled with a light-emitting control line EM (namely, light-emitting control transistors T5 and T6), a gate electrode coupled with a first reset signal line RST1 (namely, a reset transistor T1), and a gate electrode coupled with a second reset signal line RST2 (namely, a reset transistor T2). Among the three independent parts included in the semiconductor layer, a vertical bar-shaped part is overlapped with the first reset signal line RST1 and the second reset signal line RST2. Moreover, a reset transistor T1 included in a first reset circuit 021 of one pixel circuit 02 and a reset transistor T2 included in a second reset circuit 023 of the other pixel circuit 02 share a same reset signal line.

Figure 12:
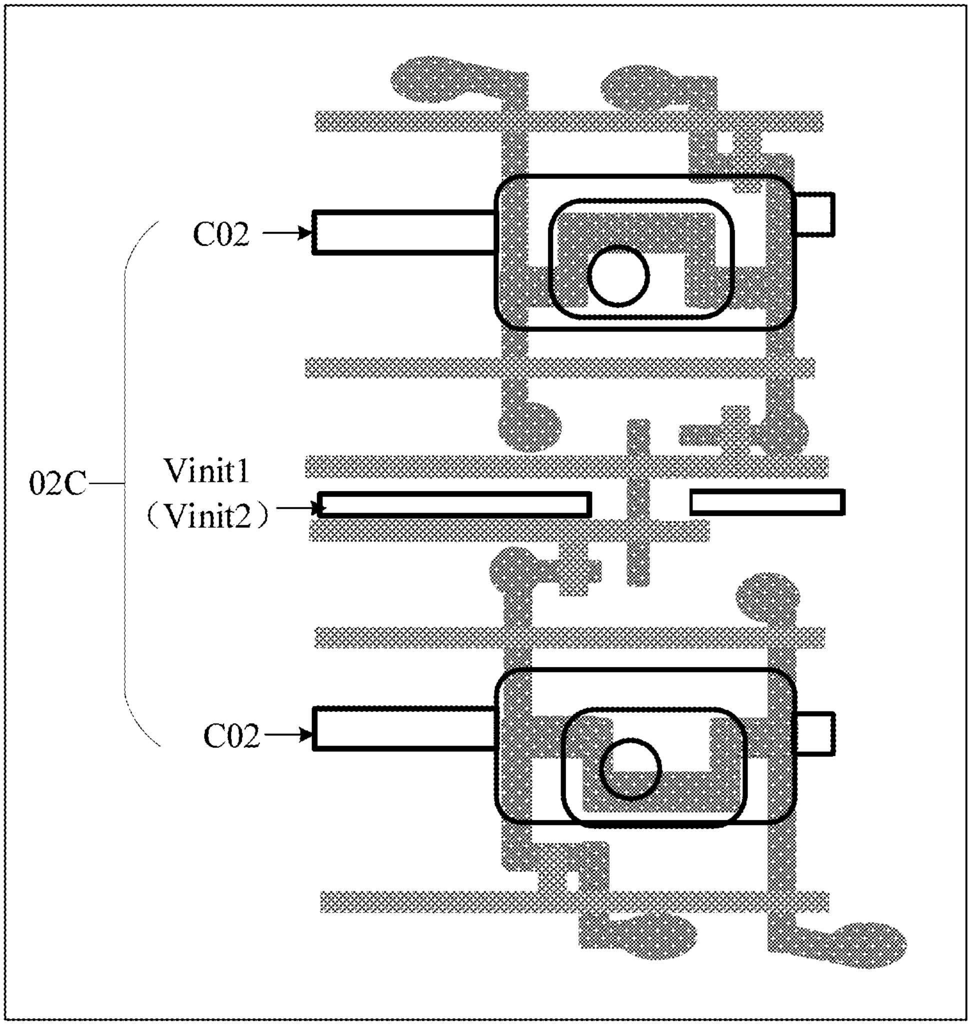
FIG. 12 is a structural layout showing a semiconductor layer, a first gate metal layer, and a second gate metal layer according to an embodiment of the present disclosure.

Referring to FIG. 12 and FIG. 13, it can be seen that the second gate metal layer 02C may be configured to form another capacitor plate C02, a first initial power line Vinit1, and a second initial power line Vinit2. Moreover, a first initial power line Vinit1 coupled with two reset transistors T1 and a second initial power line Vinit2 coupled with two reset transistors T2 share a same line. The shared initial power line includes two independent parts which are connected by the first source-drain metal layer 02D, thereby effectively transmitting a signal.

Referring to FIG. 13, it can be seen that the first source-drain metal layer 02D and the second source-drain metal layer 02E may form data signal lines DATA1 and DATA2, a drive power line VDD, and a component used for connecting. In addition, it can be further seen that different parts which need to be coupled and are disposed on different layers can be connected through connecting holes K0. Moreover, it can be further seen that two data-writing transistors T3 are respectively coupled with different data signal lines DATA1 and DATA2; and two light-emitting control transistors T5 are respectively coupled with two drive power lines VDD.

Figure 14:
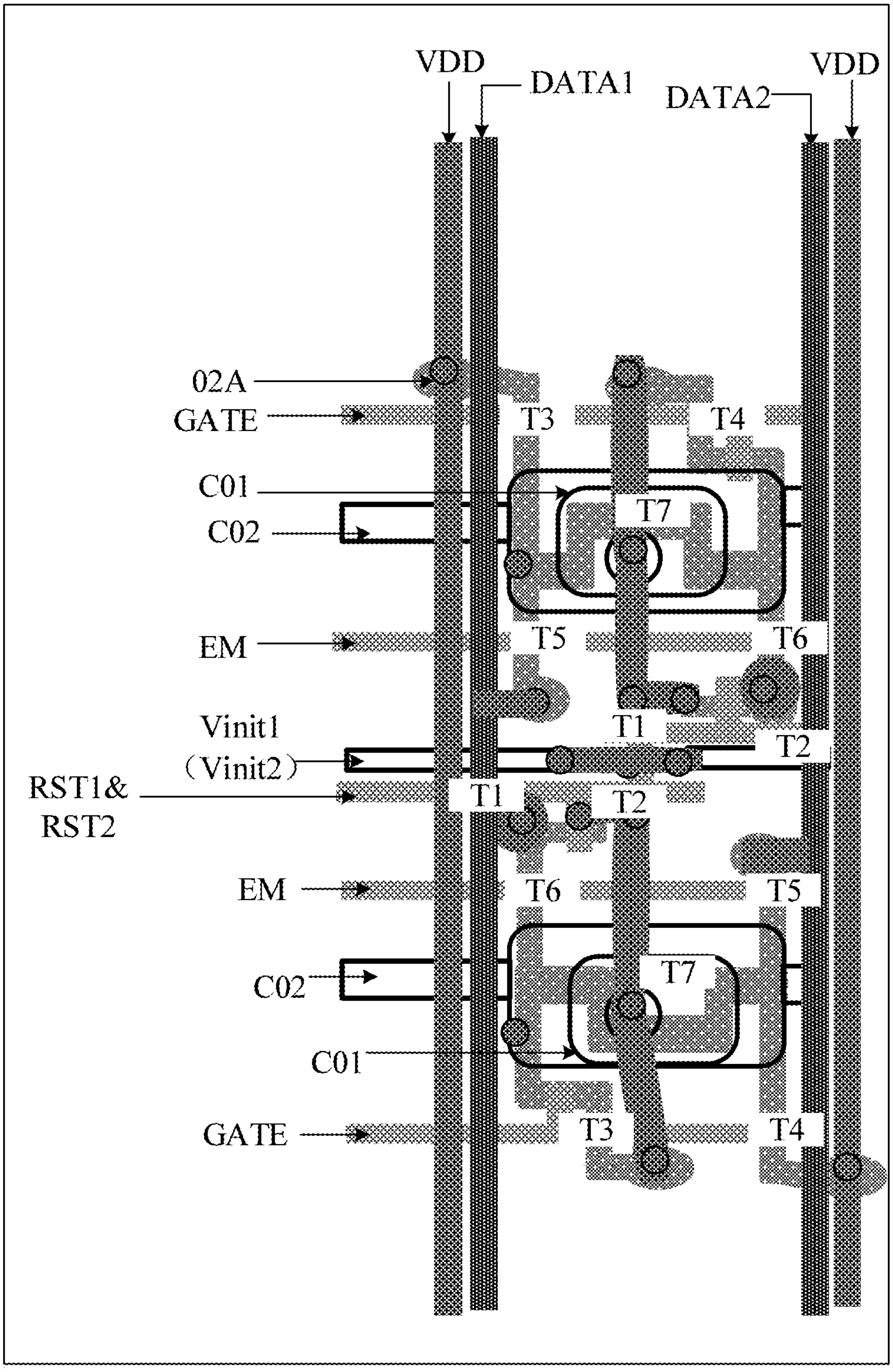
FIG. 14 is another structural layout showing a semiconductor layer, a first gate metal layer, a second gate metal layer, a first source-drain metal layer, and a second source-drain metal layer according to an embodiment of the present disclosure.

Using the structure shown in FIG. 8 as an example, FIG. 14 shows a semiconductor layer 02A, a first gate metal layer 02B, a second gate metal layer 02C, a first source-drain metal layer 02D, and a second source-drain metal layer 02E which are included in two adjacent pixel circuits 02. Moreover, with reference to FIG. 6, FIG. 14 further shows an optional location of each transistor on the layout. Compared with the structure shown in FIG. 13, referring to FIG. 14, it can be seen that two reset transistors T1 and two reset transistors T2 which are included in two adjacent pixel circuits 02 share a same reset signal line (including a first reset signal line RST1 and a second reset signal line RST2). It should be noted that a reference numeral of each layer is not shown in FIG. 14; and only each structure formed by each layer is marked.

Figure 15:
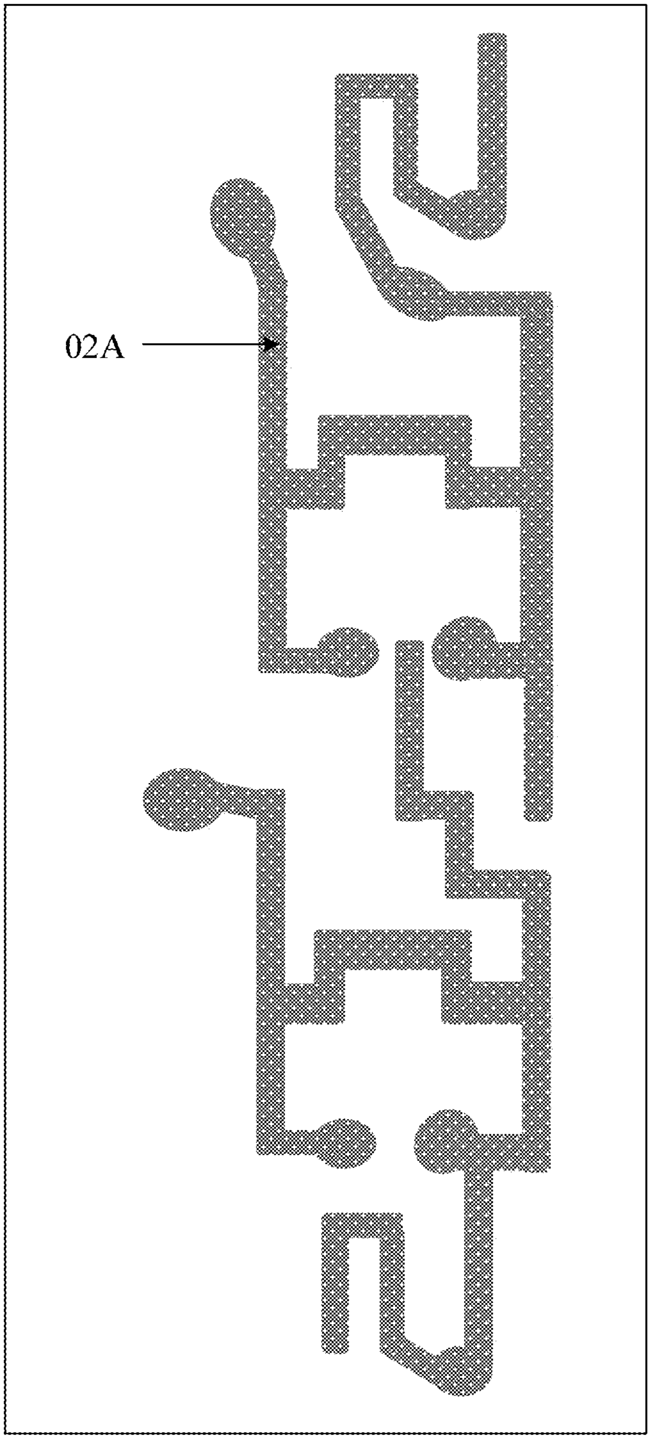
FIG. 15 is another structural layout of a semiconductor layer according to an embodiment of the present disclosure.

With reference to the above description of the pixel circuit and using the structure shown in FIG. 9 as an example, FIG. 15 shows a semiconductor layer 02A included in two adjacent pixel circuits 02. Based on FIG. 15, FIG. 16 further shows a first gate metal layer 02B included in the two adjacent pixel circuits 02. Based on FIG. 16, FIG. 17 further shows a second gate metal layer 02C included in the two adjacent pixel circuits 02. Based on FIG. 17, FIG. 18 further shows a first source-drain metal layer 02D and a second source-drain metal layer 02E included in the two adjacent pixel circuits 02. In addition, with reference to FIG. 5, FIG. 18 further shows an optional location of each transistor on the layout.

Referring to FIG. 15, it can be seen that the semiconductor layer configured to form two adjacent pixel circuits 02 includes two independent parts.

Figure 16:
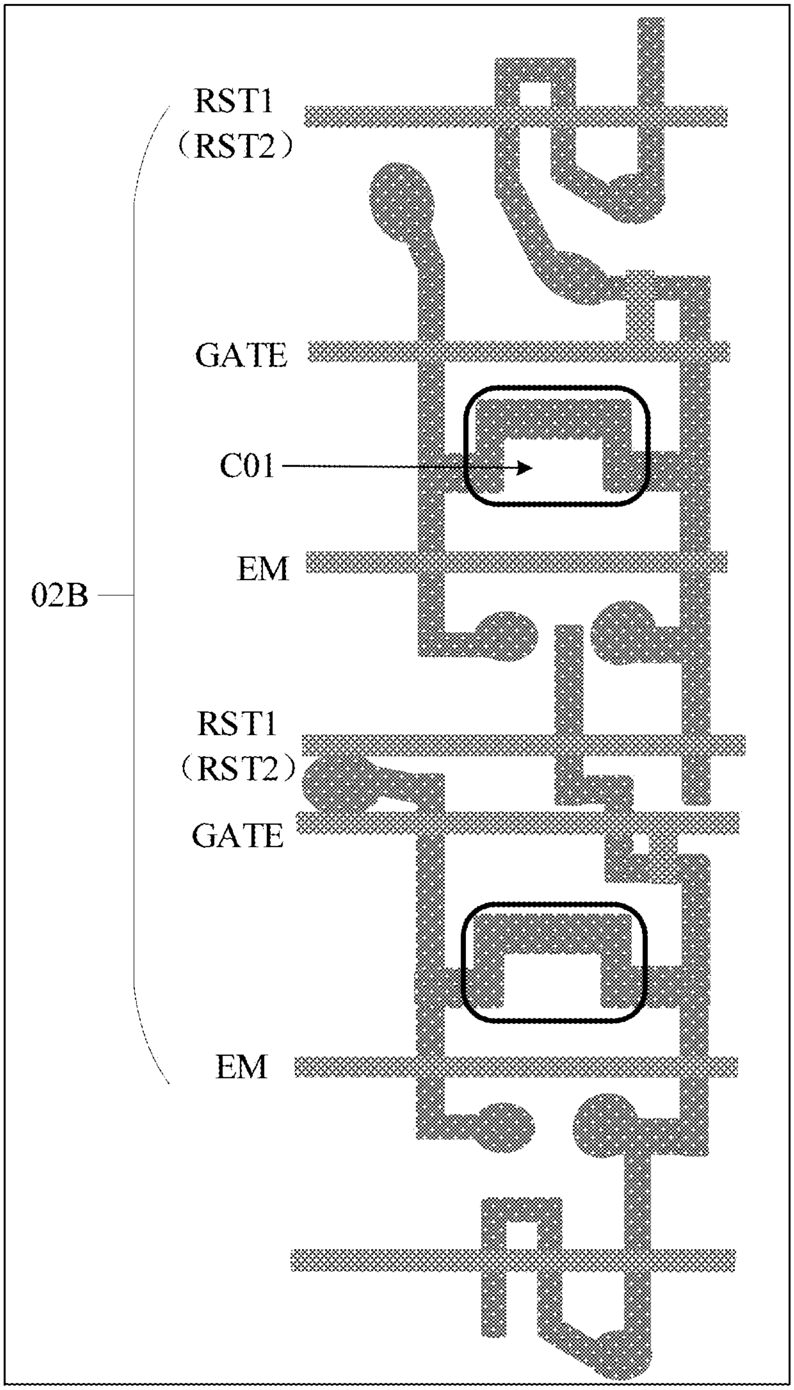
FIG. 16 is another structural layout showing a semiconductor layer and a first gate metal layer according to an embodiment of the present disclosure.
Figure 18:
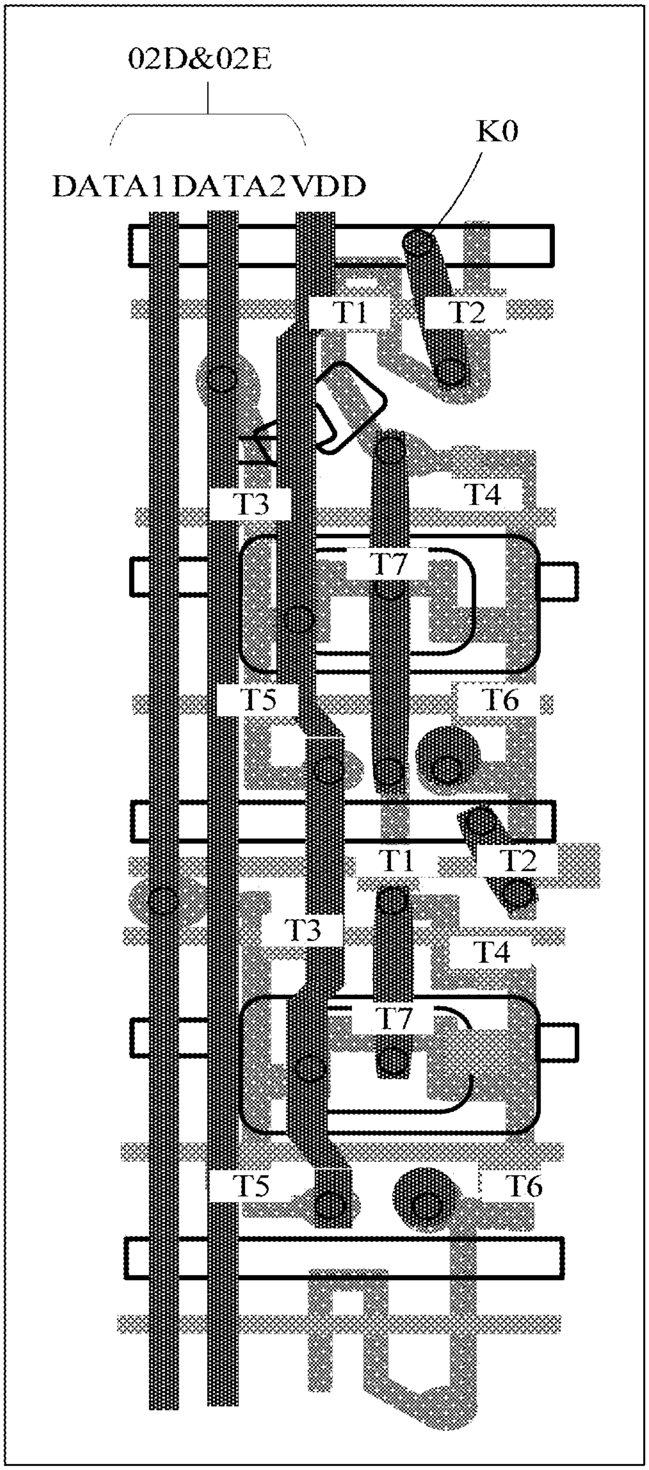
FIG. 18 is still another structural layout showing a semiconductor layer, a first gate metal layer, a second gate metal layer, a first source-drain metal layer, and a second source-drain metal layer according to an embodiment of the present disclosure.

Referring to FIG. 16 and FIG. 18, it can be seen that the first gate metal layer 02B can be configured to form a gate electrode coupled with a gate drive line GATE (namely, a data-writing transistor T3 and a compensation transistor T4), a capacitor plate C01, a gate electrode coupled with a light-emitting control line EM (namely, light-emitting control transistors T5 and T6), a gate electrode coupled with a first reset signal line RST1 (namely, a reset transistor T1), and a gate electrode coupled with a second reset signal line RST2 (namely, a reset transistor T2). In each pixel circuit 02, a reset transistor T1 and a reset transistor T2 share a same reset signal line.

Figure 17:
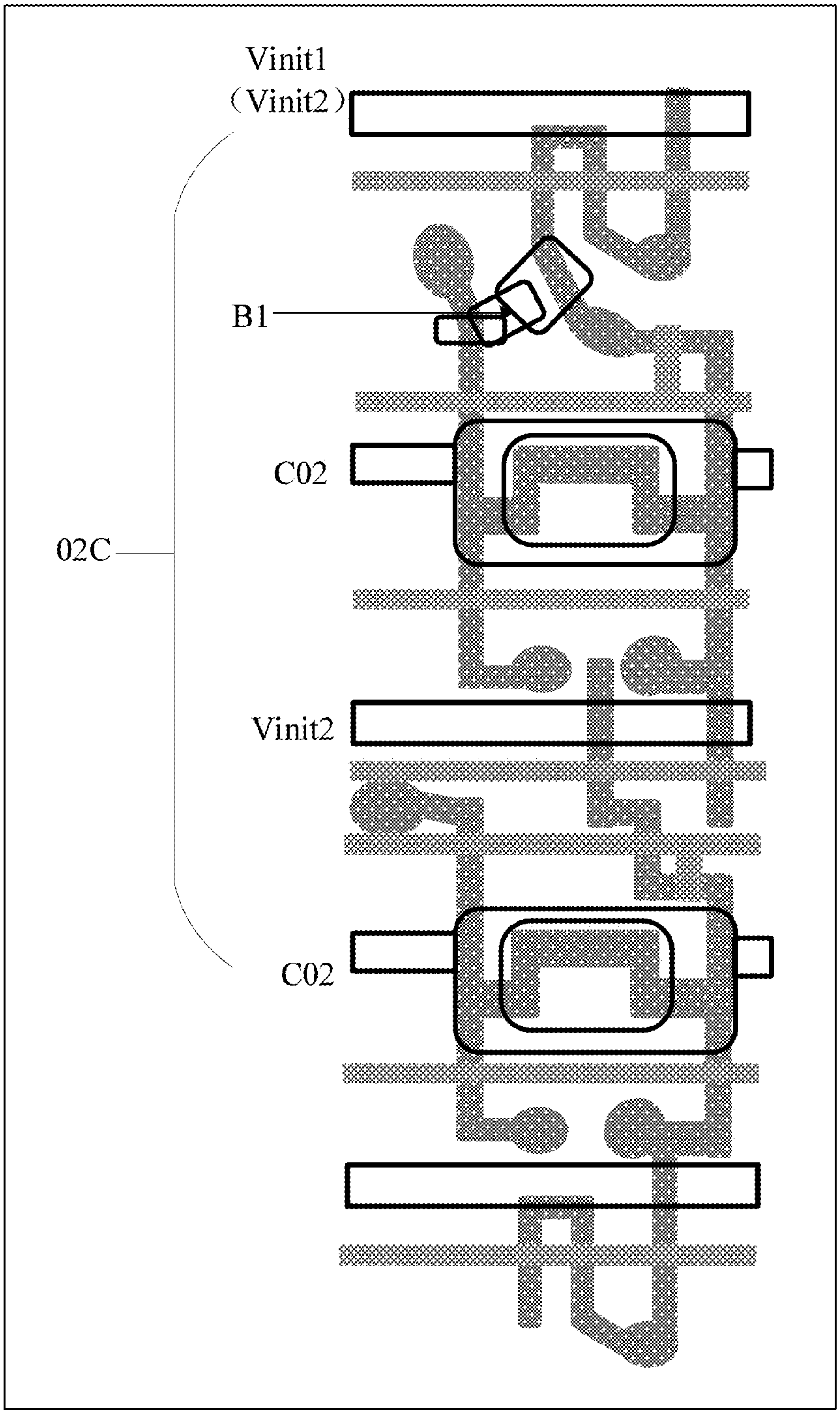
FIG. 17 is another structural layout showing a semiconductor layer, a first gate metal layer, and a second gate metal layer according to an embodiment of the present disclosure.

Referring to FIG. 17 and FIG. 18, it can be seen that the second gate metal layer 02C may be configured to form another capacitor plate C02, a first initial power line Vinit1, and a second initial power line Vinit2. Moreover, a first initial power line Vinit1 coupled with a reset transistor T1 of a first pixel circuit 02 and a second initial power line Vinit2 coupled with a reset transistor T2 of the first pixel circuit 02 share a same line. A reset transistor T1 of a second pixel circuit 02 is coupled with the reset transistor T1 of the first pixel circuit 02 through a first source-drain metal layer 02D. A reset transistor T2 of the second pixel circuit 02 is coupled with a second initial power line Vinit2. In addition, referring to FIG. 17, it can be further seen that the second gate metal layer 02C can further form a metal overlapping part BI which is overlapped with a reset transistor T1, such that an impact of electric leakage of the reset transistor T1 on the driving node P0 can be reduced.

Referring to FIG. 18, it can be seen that the first source-drain metal layer 02D and the second source-drain metal layer 02E may form data signal lines DATA1 and DATA2, a drive power line VDD, and a component used for connecting. In addition, it can be further seen that different parts which need to be coupled and are disposed on different layers can be connected through connecting holes K0. Moreover, it can be further seen that two data-writing transistors T3 are respectively coupled with different data signal lines DATA1 and DATA2; and two light-emitting control transistors T5 are coupled with a same drive power line VDD.

Figure 19:
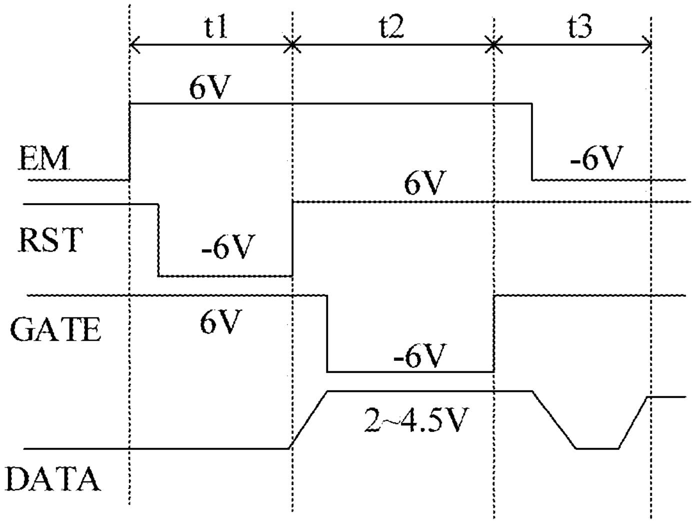
FIG. 19 is a diagram of a time sequence of each signal in a pixel circuit according to an embodiment of the present disclosure.

In some embodiments, with reference to the structures shown in FIG. 13, FIG. 14, and FIG. 18 and using an example in which each transistor is a P-type transistor, FIG. 19 shows a working sequence diagram of a pixel circuit 02. As shown in FIG. 19, a phase in which a pixel circuit 02 drives a light-emitting element 01 to emit light may include: a reset phase t1, a data-writing phase t2, and a light-emitting phase t3.

In the reset phase t1, an electric potential of a first reset signal provided by a first reset signal line RST1 and the electric potential of a second reset signal provided by a second reset signal line RST2 are both first electric potentials. In this case, reset transistors T1 and T2 of two pixel circuits 02 are both enabled. A first initial power signal provided by a first initial power line Vinit1 is transmitted to corresponding driving nodes P0 respectively through the reset transistors T1 of the two pixel circuits 02, thereby reliably resetting the driving nodes P0. A second initial power signal provided by a second initial power line Vinit2 is transmitted to the anodes of corresponding light-emitting elements 01 respectively through reset transistors T2 of the two pixel circuits 02, thereby reliably resetting the anodes of the light-emitting elements 01.

Figure 20:
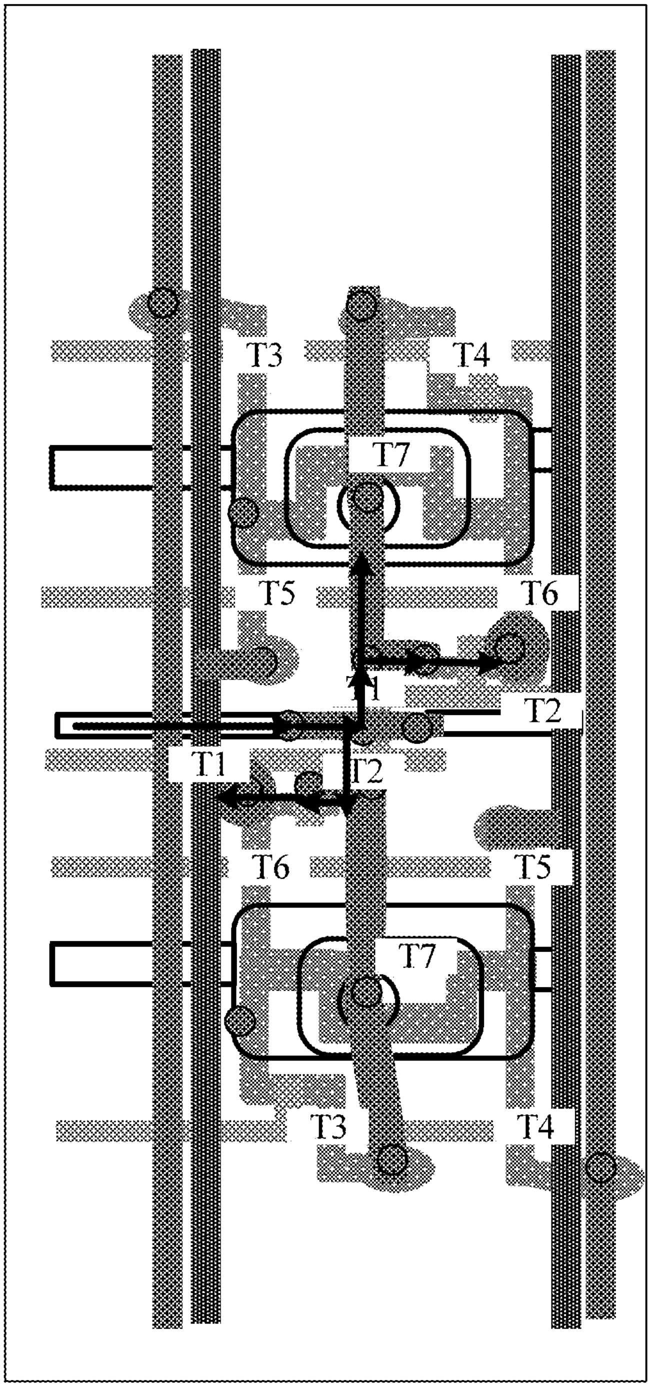
FIG. 20 is a schematic diagram of a transmission direction of a signal in a reset phase according to an embodiment of the present disclosure.
Figure 21:
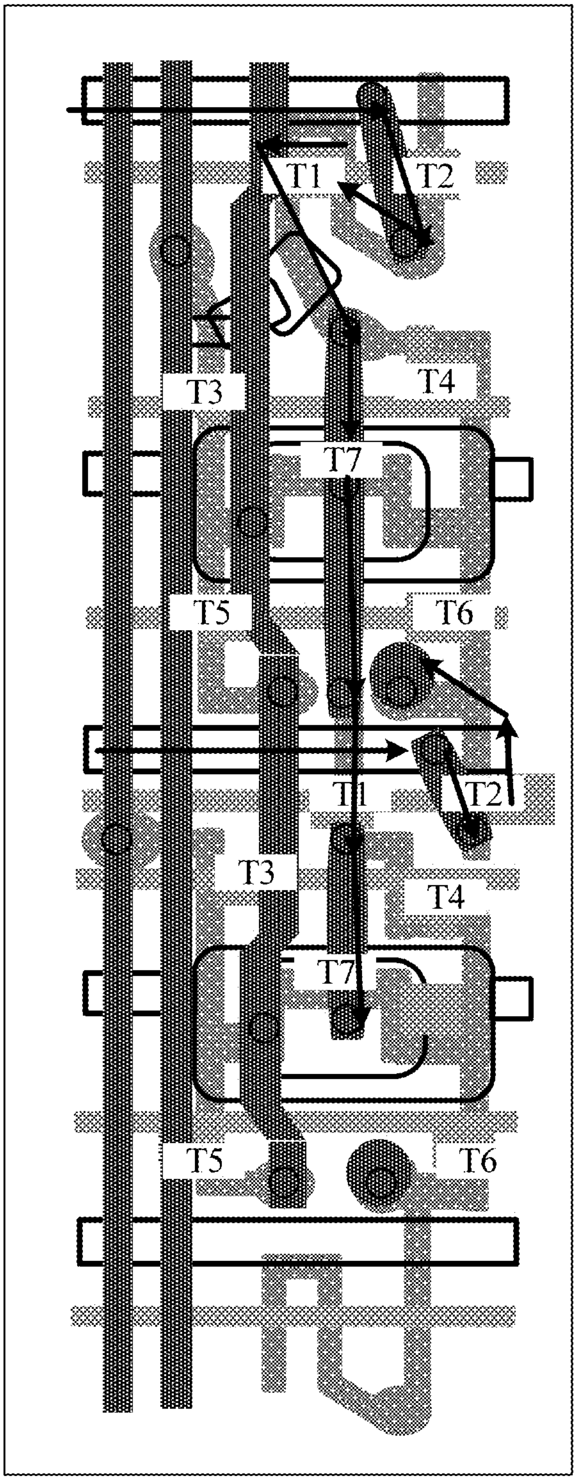
FIG. 21 is a schematic diagram of another transmission direction of a signal in a reset phase according to an embodiment of the present disclosure.

In some embodiments, FIG. 20 further shows an equivalent diagram of a signal transmission direction in the reset phase t1 based on the structure shown in FIG. 13; and FIG. 21 further shows an equivalent diagram of a signal transmission direction in the reset phase t1 based on the structure shown in FIG. 18.

In the data-writing phase 12, an electric potential of a gate drive signal provided by each gate drive line GATE is the first electric potential. In this case, data-writing transistors T3 and compensation transistors T4 of two pixel circuits 02 are both enabled. Data signals provided by data signal lines DATA1 and DATA2 are respectively transmitted to corresponding first nodes P1 through the data-writing transistors T3 coupled with the data signal lines, thereby charging the first nodes P1. In this case, drive transistors T7 are enabled and transmit the electric potentials of the first nodes P1 to second nodes P2. Then, the compensation transistors T4 adjust the electric potentials of the driving nodes P0 based on the electric potentials of the second nodes P2, thereby charging the driving nodes P0.

Figure 22:
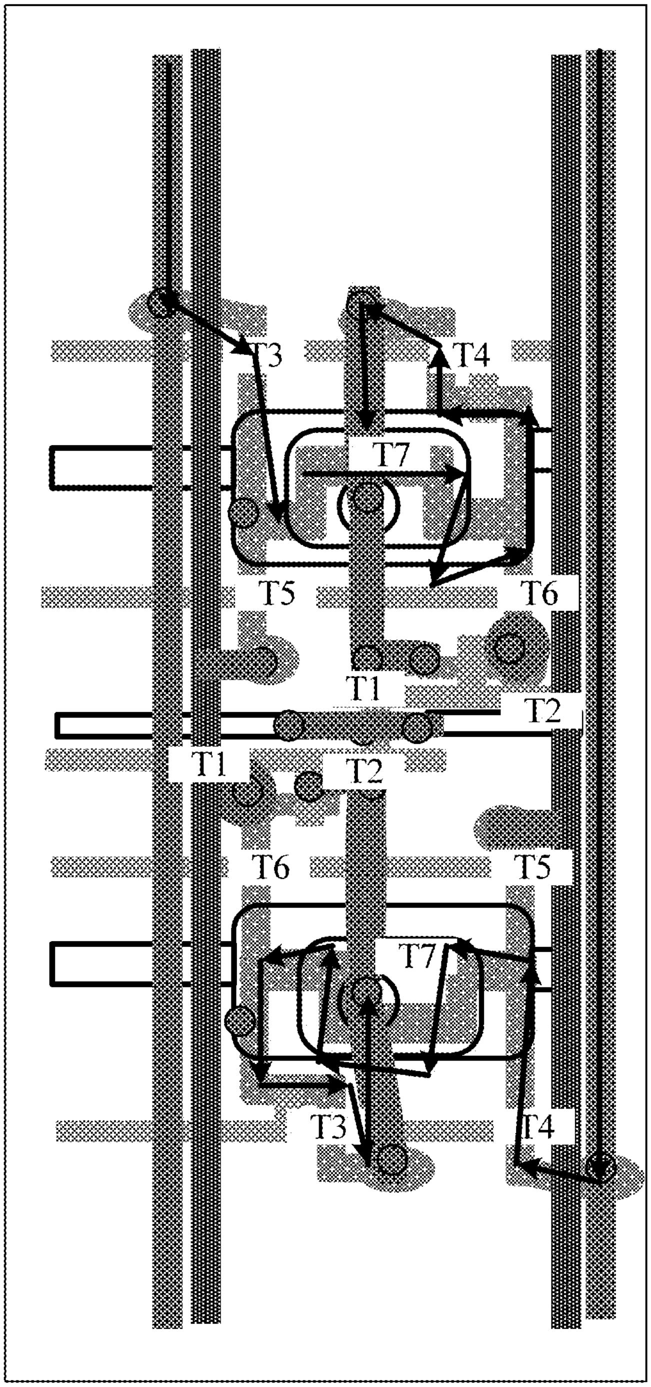
FIG. 22 is a schematic diagram of a transmission direction of a signal in a data-writing phase according to an embodiment of the present disclosure.
Figure 23:
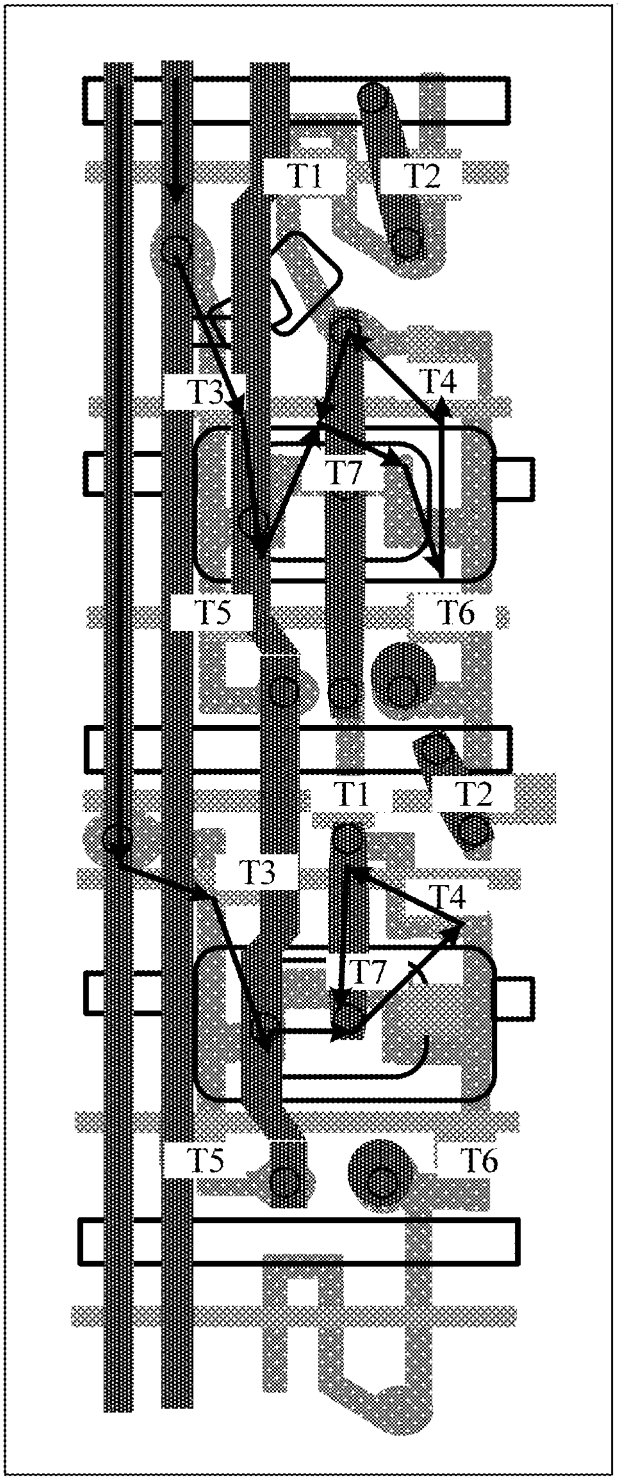
FIG. 23 is a schematic diagram of another transmission direction of a signal in a data-writing phase according to an embodiment of the present disclosure.

In some embodiments, FIG. 22 shows an equivalent diagram of a signal transmission direction in the data-writing phase t2 based on the structure shown in FIG. 13; and FIG. 23 further shows an equivalent diagram of a signal transmission direction in the data-writing phase t2 based on the structure shown in FIG. 18.

In the light-emitting phase t3, an electric potential of a light-emitting control signal provided by each light-emitting control line EM is a first electric potential; and light-emitting control transistors T5 and T6 included in two pixel circuits 02 are both enabled. A drive power signal which is of a first electric potential and provided by a drive power line VDD can be transmitted to the first nodes P1 through the light-emitting control transistors T5. In this case, the drive transistors T7 may transmit a drive current to the second nodes P2 based on electric potentials written to the driving nodes P0 in the data-writing phase t2 and the current electric potentials of the first nodes P1. The drive current may be further transmitted to the anodes of light-emitting elements 01 through the light-emitting control transistors T6, such that the light-emitting elements 01 can emit light.

Figure 24:
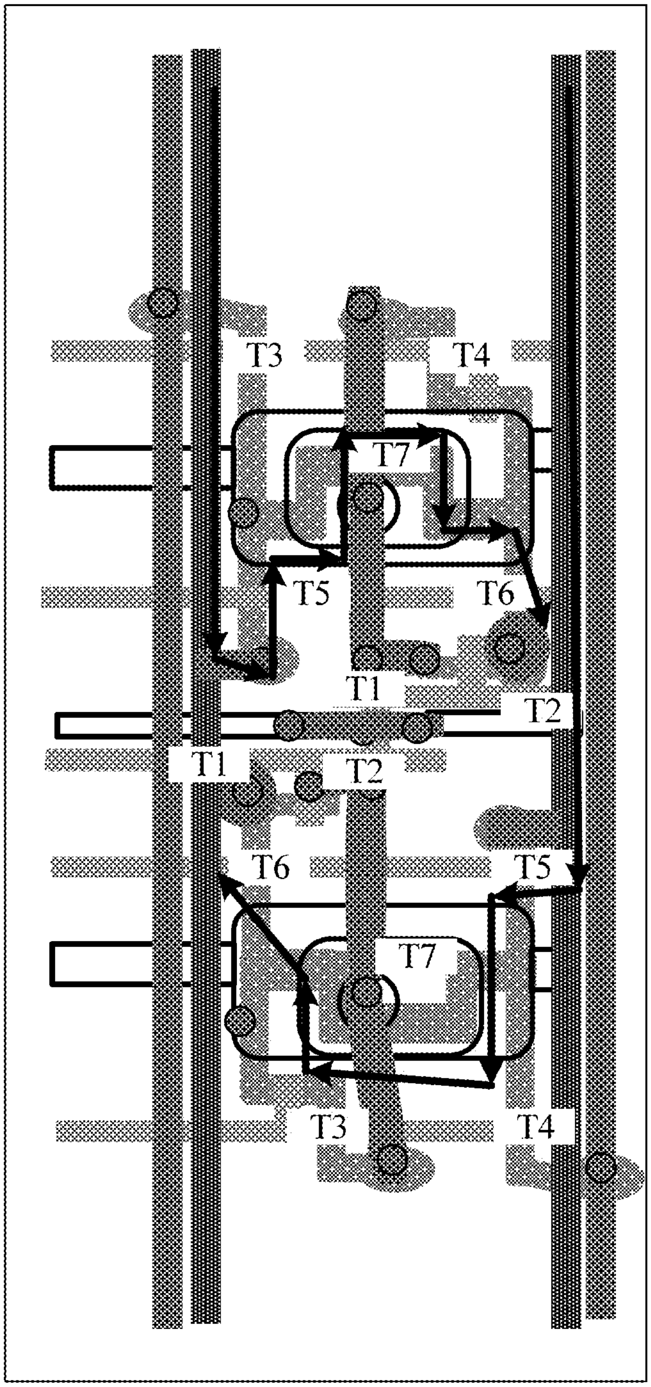
FIG. 24 is a schematic diagram of a transmission direction of a signal in a light-emitting phase according to an embodiment of the present disclosure.
Figure 25:
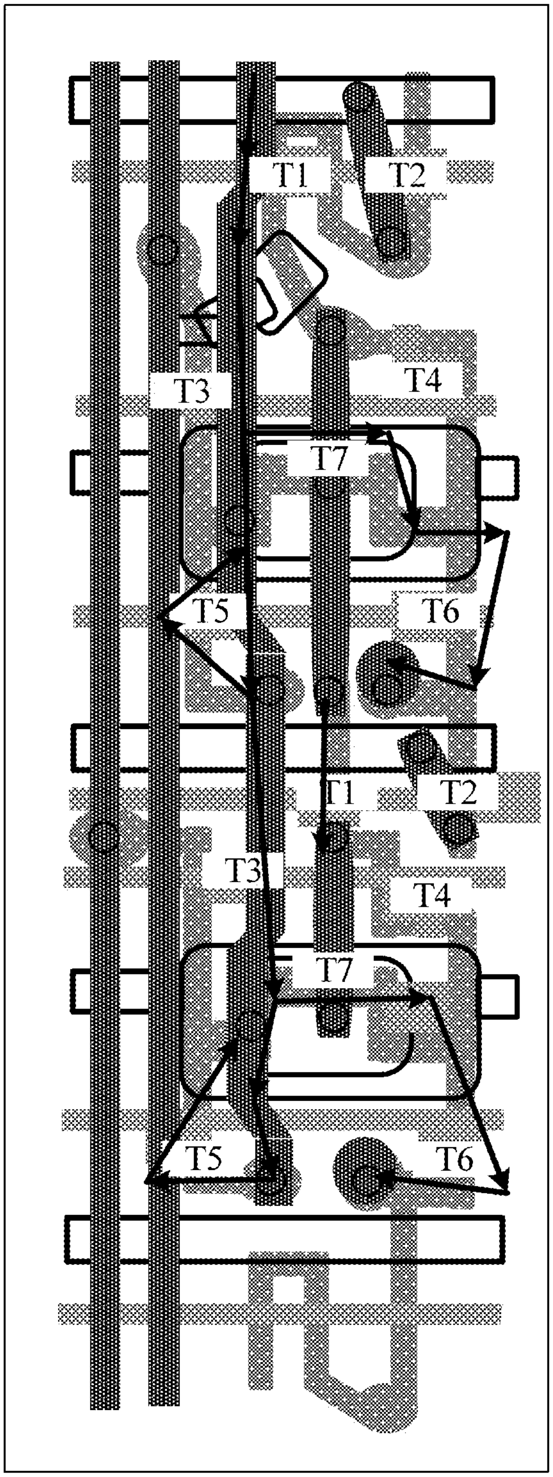
FIG. 25 is a schematic diagram of another transmission direction of a signal in a light-emitting phase according to an embodiment of the present disclosure.

In some embodiments, FIG. 24 shows an equivalent diagram of a signal transmission direction in the light-emitting phase t3 based on the structure shown in FIG. 13; and FIG. 25 further shows an equivalent diagram of a signal transmission direction in the light-emitting phase t3 based on the structure shown in FIG. 18.

It should be noted that, in FIG. 19, a time sequence of a reset signal represents time sequences of a first reset signal and a second reset signal; and a time sequence of a data signal represents time sequences of a first data signal and a second data signal. Moreover, the first electric potential, the second electric potential, and the electric potential of the data signal which are shown in FIG. 19 are −6 V (volt), 6 V, and about 2 V to 4.5 V, respectively. With reference to the working sequence diagram shown in FIG. 19, it can be seen that in this embodiment of the present disclosure, two adjacent pixel circuits in a same column can emit light simultaneously; and the brightness of the light can vary with data signals provided by data signal lines respectively coupled with the pixel circuits. Therefore, it can be determined that the refresh rate of the display panel described in this embodiment of the present disclosure is higher.

In addition, with reference to the above description, it can be seen that the structures of the two pixel circuits 02 in this embodiment of the present disclosure are 14T2C (that is, 14 transistors and 2 capacitors) structures. In some embodiments, the structures of the two pixel circuits 02 may also be other structures (for example, 12T2C structures). Two adjacent pixel circuits 02 respectively drive two light-emitting elements 02 to emit light independently, and can share a signal in the reset phase t1. In this way, the refresh rate of the display panel is improved while a high PPI of the display panel is ensured.

It should be noted that, the above embodiments are all described by using an example in which all the transistors are P-type transistors and the first electric potential is lower than the second electric potential. All the transistors may alternatively be N-type transistors. When all the transistors are the N-type transistors, the first electric potential is higher than the second electric potential.

In summary, a display panel is provided in this embodiment of the present disclosure. The display panel includes a base substrate and a plurality of pixel circuits disposed on the base substrate. At least two pixel circuits in a same column are coupled with a same first initial power line, such that only a small quantity of signal lines need to be disposed on the base substrate. Accordingly, an area which needs to be occupied by the signal lines and is of the base substrate becomes smaller, thereby facilitating high-resolution design of the display panel.

Figure 26:
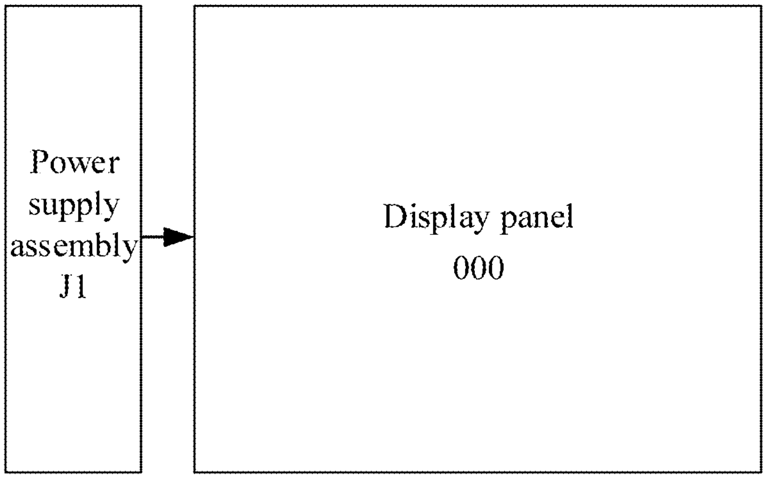
FIG. 26 is a schematic structural diagram of a display device according to an embodiment of the present disclosure.

FIG. 26 is a schematic structural diagram of a display device according to an embodiment of the present disclosure. As shown in FIG. 26, the display device may include a power supply assembly J1 and the display panel 000 shown in the above accompanying drawings. The power supply assembly J1 may be coupled with the display panel 000 and configured to supply power to the display panel 000.

In some embodiments, the display device may be any product or component with a display function, such as a liquid crystal display device, electronic paper, an OLED device, a mobile phone, a tablet computer, a TV, a monitor, a notebook computer, a digital photo frame, or a navigator.

It should be understood that the terms "first," "second," and the like in the description and claims, as well as the above-mentioned drawings, of the present disclosure are used to distinguish similar objects, and not necessarily used to describe a specific order or precedence order. It should be understood that data used in this way can be interchanged where appropriate. For example, the present disclosure can be implemented in a sequence other than the sequence illustrated or described in the embodiments of the present disclosure.

The above descriptions are merely exemplary embodiments of the present disclosure, and are not intended to limit the present disclosure. Any modifications, equivalent replacements, or improvements and the like made within the spirit and principles of the present disclosure should be included within the protection scope of the present disclosure.

What is claimed is:

1. A display panel, comprising:

a base substrate;

a plurality of light-emitting elements disposed on a side of the base substrate;

a plurality of first initial power lines, a plurality of first reset signal lines, a plurality of second initial power lines, a plurality of second reset signal lines, a plurality of data signal lines, a plurality of gate drive lines, a plurality of drive power lines, and a plurality of light-emitting control lines which are disposed on a side of the base substrate; and a plurality of pixel circuits disposed on a side of the base substrate and arranged in an array, each of the plurality of pixel circuits comprising a first reset circuit and a drive circuit;

wherein the first reset circuit is coupled with a first reset signal line, a first initial power line, and a driving node, and is configured to transmit a first initial power signal provided by the first initial power line to the driving node in response to a first reset signal provided by the first reset signal line; the drive circuit is coupled with the driving node and a light-emitting element, and is configured to transmit a drive signal to the light-emitting element based on an electric potential of the driving node; and among a plurality of pixel circuits in a same column, first reset circuits comprised in at least two pixel circuits share a same first initial power line; and among all first reset circuits sharing a same first initial power line, a target first reset circuit is coupled with the first initial power line, and other first reset circuits except the target first reset circuit are coupled with the target first reset circuit, wherein the target first reset circuit is a first reset circuit of a pixel circuit in a first row;

each of the plurality of pixel circuits comprises a semiconductor layer, a first gate metal layer, a second gate metal layer, a first source-drain metal layer, and a second source-drain metal layer that are disposed on a side of the base substrate and stacked in a direction distal from the base substrate in sequence, wherein the semiconductor layer configured to form two adjacent pixel circuits comprises two independent parts, and the other first reset circuits except the target first reset circuit are coupled with the target first reset circuit through the first source-drain metal layer;

wherein the first gate metal layer is configured to form a gate electrode coupled with a gate drive line, a capacitor plate, a gate electrode coupled with a light-emitting control line, a gate electrode coupled with a first reset signal line, and a gate electrode coupled with a second reset signal line;

the second gate metal layer is configured to form another capacitor plate, a first initial power line, a second initial power line, and a metal overlapping part, wherein the metal overlapping part is overlapped with a first reset circuit; and the first source-drain metal layer and the second source-drain metal layer are configured to form the data signal lines and the drive power lines, and different parts which need to be coupled in a pixel circuit are connected through connecting holes.

2. The display panel according to claim 1, wherein first reset circuits comprised in every two adjacent pixel circuits share a same first initial power line; and each first reset circuit comprises a reset transistor, wherein a gate electrode of the reset transistor is coupled with a first reset signal line; a second electrode of the reset transistor is coupled with a driving node of a pixel circuit to which the reset transistor belongs; and between two reset transistors coupled with a same first initial power line, a first electrode of one reset transistor is coupled with the first initial power line, and a first electrode of the other reset transistor is coupled with a second electrode of the one reset transistor.

3. The display panel according to claim 1, wherein all first reset circuits sharing a same first initial power line are coupled with the first initial power line.

4. The display panel according to claim 3, wherein first reset circuits comprised in every two adjacent pixel circuits share a same first initial power line; and each first reset circuit comprises a reset transistor, wherein a gate electrode of the reset transistor is coupled with a first reset signal line; a second electrode of the reset transistor is coupled with a driving node of a pixel circuit to which the reset transistor belongs; and a first electrode of the reset transistor is coupled with the first initial power line.

5. The display panel according to claim 2, wherein the reset transistor is a single-gate transistor; and an active layer material of the single-gate transistor comprises an oxide material.

6. The display panel according to claim 1, wherein each of the plurality of pixel circuits further comprises a second reset circuit, wherein the second reset circuit is coupled with a second reset signal line, a second initial power line, and a light-emitting element, and is configured to transmit a second initial power signal provided by the second initial power line to the light-emitting element in response to a second reset signal provided by the second reset signal line.

7. The display panel according to claim 6, wherein all first reset circuits sharing a same first initial power line are coupled with the first initial power line; and among a plurality of pixel circuits in a same column, second reset circuits comprised in at least two pixel circuits are coupled with a same second initial power line; and the same first initial power line coupled with the first reset circuits and the same second initial power line coupled with the second reset circuits share a same line.

8. The display panel according to claim 7, wherein two first reset circuits comprised in every two adjacent pixel circuits are coupled with a same first initial power line;

two second reset circuits comprised in every two adjacent pixel circuits are coupled with a same second initial power line; and in every two adjacent pixel circuits, a first reset signal line coupled with a first reset circuit comprised in one pixel circuit and a second reset signal line coupled with a second reset circuit comprised in the other pixel circuit share a same line.

9. The display panel according to claim 8, wherein in every two adjacent pixel circuits, a first reset signal line coupled with a first reset circuit comprised in one pixel circuit and a first reset signal line coupled with a first reset circuit comprised in the other pixel circuit share a same line; and in every two adjacent pixel circuits, a second reset signal line coupled with a second reset circuit comprised in one pixel circuit and a second reset signal line coupled with a second reset circuit comprised in the other pixel circuit share a same line.

10. The display panel according to claim 6, wherein among all first reset circuits sharing a same first initial power line, the target first reset circuit is coupled with the first initial power line, and the other first reset circuits except the target first reset circuit are coupled with the target first reset circuit; and in each of the plurality of pixel circuits, the first reset signal line coupled with the first reset circuit and the second reset signal line coupled with the second reset circuit share a same line.

11. The display panel according to claim 1, wherein the drive circuits is further coupled with a data signal line, a gate drive line, a drive power line, and a light-emitting control line, and is configured to transmit a drive signal to the light-emitting element based on a gate drive signal provided by the gate drive line, a data signal provided by the data signal line, a drive power signal provided by the drive power line, and the electric potential of the driving node; and drive circuits comprised in at least two pixel circuits sharing a same first initial power line are coupled with different data signal lines.

12. The display panel according to claim 11, wherein all first reset circuits sharing a same first initial power line are coupled with the first initial power line; and drive circuits comprised in at least two pixel circuits sharing a same first initial power line are coupled with different drive power lines.

13. The display panel according to claim 11, wherein among all first reset circuits sharing a same first initial power line, the target first reset circuit is coupled with the first initial power line, and the other first reset circuits except the target first reset circuit are coupled with the target first reset circuit; and drive circuits comprised in at least two pixel circuits sharing a same first initial power line are coupled with a same drive power line.

14. A display device, comprising: a power supply assembly and a display panel, wherein the display panel comprises:

a base substrate;

a plurality of light-emitting elements disposed on a side of the base substrate;

a plurality of first initial power lines, a plurality of first reset signal lines, a plurality of second initial power lines, a plurality of second reset signal lines, a plurality of data signal lines, a plurality of gate drive lines, a plurality of drive power lines, and a plurality of light-emitting control lines which are disposed on a side of the base substrate; and a plurality of pixel circuits disposed on a side of the base substrate and arranged in an array, each of the plurality of pixel circuits comprising a first reset circuit and a drive circuit;

wherein the first reset circuit is coupled with a first reset signal line, a first initial power line, and a driving node, and is configured to transmit a first initial power signal provided by the first initial power line to the driving node in response to a first reset signal provided by the first reset signal line; the drive circuit is coupled with the driving node and a light-emitting element, and is configured to transmit a drive signal to the light-emitting element based on an electric potential of the driving node; and among a plurality of pixel circuits in a same column, first reset circuits comprised in at least two pixel circuits share a same first initial power line; and among all first reset circuits sharing a same first initial power line, a target first reset circuit is coupled with the first initial power line, and other first reset circuits except the target first reset circuit are coupled with the target first reset circuit, wherein the target first reset circuit is a first reset circuit of a pixel circuit in a first row;

each of the plurality of pixel circuits comprises a semiconductor layer, a first gate metal layer, a second gate metal layer, a first source-drain metal layer, and a second source-drain metal layer that are disposed on a side of the base substrate and are stacked in a direction distal from the base substrate in sequence, wherein the semiconductor layer configured to form two adjacent pixel circuits comprises two independent parts; and the other first reset circuits except the target first reset circuit are coupled with the target first reset circuit through the first source-drain metal layer;

wherein the first gate metal layer is configured to form a gate electrode coupled with a gate drive line, a capacitor plate, a gate electrode coupled with a light-emitting control line, a gate electrode coupled with a first reset signal line, and a gate electrode coupled with a second reset signal line;

the second gate metal layer is configured to form another capacitor plate, a first initial power line, a second initial power line, and a metal overlapping part, wherein the metal overlapping part is overlapped with a first reset circuit; and the first source-drain metal layer and the second source-drain metal layer are configured to form the data signal lines and the drive power lines, and different parts which need to be coupled in a pixel circuit are connected through connecting holes; and the power supply assembly is coupled with the display panel and is configured to supply power to the display panel.

15. The display panel according to claim 4, wherein the reset transistor is a single-gate transistor; and an active layer material of the single-gate transistor comprises an oxide material.

16. The display device according to claim 14, wherein first reset circuits comprised in every two adjacent pixel circuits share a same first initial power line; and each first reset circuit comprises a reset transistor, wherein a gate electrode of the reset transistor is coupled with a first reset signal line; a second electrode of the reset transistor is coupled with a driving node of a pixel circuit to which the reset transistor belongs; and between two reset transistors coupled with a same first initial power line, a first electrode of one reset transistor is coupled with the first initial power line, and a first electrode of the other reset transistor is coupled with a second electrode of the one reset transistor.

17. The display device according to claim 14, wherein all first reset circuits sharing a same first initial power line are coupled with the first initial power line.

18. The display device according to claim 17, wherein first reset circuits comprised in every two adjacent pixel circuits share a same first initial power line; and each first reset circuit comprises a reset transistor, wherein a gate electrode of the reset transistor is coupled with a first reset signal line; a second electrode of the reset transistor is coupled with a driving node of a pixel circuit to which the reset transistor belongs; and a first electrode of the reset transistor is coupled with the first initial power line.

* * * * *